United States Patent
Hirokubo

(10) Patent No.: US 9,372,293 B2
(45) Date of Patent: Jun. 21, 2016

(54) VARIABLE WAVELENGTH INTERFERENCE FILTER, OPTICAL MODULE, ELECTRONIC APPARATUS, AND METHOD OF MANUFACTURING VARIABLE WAVELENGTH INTERFERENCE FILTER

(71) Applicant: Seiko Epson Corporation, Tokyo (JP)

(72) Inventor: Nozomu Hirokubo, Fujimi (JP)

(73) Assignee: Seiko Espon Corporation (JP)

( * ) Notice: Subject to any disclaimer, the term of this patent is extended or adjusted under 35 U.S.C. 154(b) by 93 days.

(21) Appl. No.: 14/013,619

(22) Filed: Aug. 29, 2013

(65) Prior Publication Data

US 2014/0063501 A1    Mar. 6, 2014

(30) Foreign Application Priority Data

Aug. 30, 2012 (JP) .................... 2012-189626

(51) Int. Cl.
*G01N 21/25* (2006.01)
*G02B 5/28* (2006.01)
*G02B 26/00* (2006.01)

(52) U.S. Cl.
CPC .............. *G02B 5/28* (2013.01); *G02B 5/284* (2013.01); *G02B 26/001* (2013.01); *Y10T 156/10* (2015.01); *Y10T 156/1052* (2015.01)

(58) Field of Classification Search
CPC ................................................. G02B 26/001
See application file for complete search history.

(56) References Cited

U.S. PATENT DOCUMENTS

| | | | |
|---|---|---|---|
| 4,859,060 A * | 8/1989 | Katagiri et al. | 356/454 |
| 6,985,281 B2 | 1/2006 | Wagner et al. | |
| 7,002,697 B2 | 2/2006 | Domash et al. | |
| 7,348,263 B2 | 3/2008 | Hashimoto | |
| 7,483,211 B2 * | 1/2009 | Nakamura et al. | 359/579 |
| 7,573,547 B2 * | 8/2009 | Palmateer et al. | 349/106 |
| 7,729,033 B2 | 6/2010 | Souriau | |
| 7,733,552 B2 | 6/2010 | Londergan et al. | |
| 7,867,830 B2 | 1/2011 | Hashimoto | |
| 8,164,815 B2 | 4/2012 | Londergan et al. | |
| 2003/0072009 A1 | 4/2003 | Domash et al. | |
| 2003/0151818 A1 | 8/2003 | Wagner et al. | |
| 2005/0068627 A1 | 3/2005 | Nakamura et al. | |
| 2006/0060788 A1 | 3/2006 | Uchida et al. | |
| 2006/0076631 A1* | 4/2006 | Palmateer | B81B 7/0041 257/414 |

(Continued)

FOREIGN PATENT DOCUMENTS

JP    62-257032    11/1987
JP    2001-277198 A    10/2001

(Continued)

*Primary Examiner* — Kara E Geisel
*Assistant Examiner* — Shawn Decenzo
(74) *Attorney, Agent, or Firm* — Harness, Dickey & Pierce, P.L.C.

(57) ABSTRACT

A variable wavelength interference filter includes a first substrate having a stationary mirror, a second substrate bonded to the first substrate and provided with a movable section and a movable mirror fixed to the movable section, and a third substrate bonded to the second substrate on an opposite side to the first substrate, and is provided with a first inner space sandwiched by the first substrate and the second substrate, a first gap, through which the first inner space communicates with the outside, a second inner space sandwiched by the second substrate and the third substrate, and a second gap, through which the second inner space communicates with the outside, and the first gap and the second gap are each sealed by a sealing member.

19 Claims, 15 Drawing Sheets

(56) References Cited

U.S. PATENT DOCUMENTS

| | | |
|---|---|---|
| 2006/0183644 A1 | 8/2006 | Nakamura et al. |
| 2006/0196408 A1 | 9/2006 | Hashimoto |
| 2007/0171530 A1* | 7/2007 | Nakamura .................... 359/580 |
| 2008/0128918 A1 | 6/2008 | Hashimoto |
| 2008/0170298 A1 | 7/2008 | Souriau |
| 2008/0231931 A1 | 9/2008 | Londergan et al. |
| 2009/0129031 A1 | 5/2009 | Someya et al. |
| 2009/0323170 A1* | 12/2009 | Lin .............................. 359/291 |
| 2010/0245979 A1 | 9/2010 | Londergan et al. |
| 2011/0074250 A1 | 3/2011 | Hashimoto |
| 2012/0206462 A1 | 8/2012 | Londergan et al. |
| 2013/0038876 A1 | 2/2013 | Arakawa et al. |

FOREIGN PATENT DOCUMENTS

| | | |
|---|---|---|
| JP | 2002-116390 A | 4/2002 |
| JP | 2005-055790 A | 3/2005 |
| JP | 2005-062384 A | 3/2005 |
| JP | 2005-062386 A | 3/2005 |
| JP | 2005-510756 A | 4/2005 |
| JP | 2005-309099 A | 11/2005 |
| JP | 2005-309174 A | 11/2005 |
| JP | 2006-071601 A | 3/2006 |
| JP | 3786106 B2 | 3/2006 |
| JP | 2006-090983 A | 4/2006 |
| JP | 2006-237200 A | 9/2006 |
| JP | 2006-245098 A | 9/2006 |
| JP | 2007-149816 A | 6/2007 |
| JP | 2008-203831 A | 9/2008 |
| JP | 2010-524010 A | 7/2010 |
| JP | 4603489 A | 10/2010 |
| JP | 2012-163912 A | 8/2012 |
| WO | WO-03-012531 A1 | 2/2003 |
| WO | WO-03-046630 A1 | 6/2003 |
| WO | WO-2008-115716 A2 | 9/2008 |

* cited by examiner

VARIABLE WAVELENGTH INTERFERENCE FILTER, OPTICAL MODULE, ELECTRONIC APPARATUS, AND METHOD OF MANUFACTURING VARIABLE WAVELENGTH INTERFERENCE FILTER

BACKGROUND

1. Technical Field

The present invention relates to a variable wavelength interference filter for selectively emitting light with a desired target wavelength out of the incident light, an optical module equipped with the variable wavelength interference filter, an electronic apparatus equipped with the optical module, and a method of manufacturing a variable wavelength interference filter.

2. Related Art

In the past, there has been known a spectral filter, which reflects light between a pair of mirrors to transmit light with a specific wavelength while canceling out lights with other wavelengths each other due to interference, to thereby obtain the light with the specific wavelength out of the incident light. Further, as such a spectral filter, there has been known a variable wavelength interference filter, which selectively emits the light to be emitted by controlling the distance between the mirrors (see, e.g., JP-A-62-257032 (Document 1)).

The variable wavelength interference filter described in Document 1 is equipped with a stationary mirror provided to a light transmissive substrate, and a movable mirror disposed so as to be opposed to the stationary mirror. The variable wavelength interference filter drives the movable mirror with an electrostatic attractive force to thereby control the distance between the mirrors, and thus selects the light to be emitted.

There is a concern that such a variable wavelength interference filter is deteriorated in drive characteristics and optical characteristics due to an environmental factor such as moisture or foreign matters, and is thus degraded in reliability. Therefore, there has been known a method of airtightly encapsulating the variable wavelength interference filter in a package in order to improve the reliability of the variable wavelength interference filter (see, e.g., JP-T-2005-510756 (Document 2).

The package described in Document 2 is provided with a header, a plurality of electrically-conductive pins, and a cap having an optical window, and forms an inside space incorporating the variable wavelength interference filter therein, and airtightly sealed with the cap and the header.

However, in the case of the package described in Document 2, it is necessary to prepare the package separately from the variable wavelength interference filter, and assemble each of the components separately. Therefore, in order to ensure the reliability of the variable wavelength interference filter, a lot of cost and time is required for the package, as a separate component, and the assembling of the package. Further, since the package as a separate component has walls for housing the variable wavelength interference filter and airtightly sealing the periphery of the variable wavelength interference filter, there is a problem that the size of the variable wavelength interference filter including the package increases.

SUMMARY

An advantage of some aspects of the invention is to provide a variable wavelength interference filter, an optical module, and an electronic apparatus capable of assuring the reliability with a compact and low-cost structure.

The invention can be implemented as the following forms or application examples.

APPLICATION EXAMPLE 1

This application example is directed to a variable wavelength interference filter including a first substrate having a light transmissive property, a second substrate having a light transmissive property, which is opposed to the first substrate, and bonded to the first substrate, a third substrate having a light transmissive property, which is opposed to an opposite side of the second substrate to a side provided with the first substrate, and is bonded to the second substrate, a movable section provided to the second substrate, and having a movable surface opposed to the first substrate, a holding section provided to the second substrate, and adapted to hold the movable section so as to be able to move in a thickness direction of the second substrate, a pair of mirrors disposed respectively on the movable surface of the movable section and a surface of the first substrate on the second substrate side so as to be opposed to each other via a predetermined inter-mirror gap, and an electrostatic actuator having a pair of displacing electrodes opposed to each other disposed respectively on the surfaces of the first substrate and the second substrate opposed to each other, and making the movable section be displaced in a substrate thickness direction due to an electrostatic attractive force in response to application of a predetermined voltage to the pair of displacing electrodes, the first substrate and the second substrate are bonded to each other with a bonding layer, and the second substrate and the third substrate are bonded to each other with a bonding layer, a first inner space sandwiched by the first substrate and the second substrate, and a second inner space sandwiched by the second substrate and the third substrate are provided, a first gap, through which the first inner space communicates with the outside, is disposed between the first substrate and the second substrate, a second gap, through which the second inner space communicates with the outside, is disposed between the second substrate and the third substrate, and the first gap and the second gap are sealed by a sealing member adapted to seal the first inner space and the second inner space.

In this application example, the first gap formed between the first substrate and the second substrate, through which the first inner space sandwiched by the first substrate and the second substrate communicates with the outside, and the second gap formed between the second substrate and the third substrate, through which the second inner space sandwiched by the second substrate and the third substrate communicates with the outside are sealed with the sealing member, to thereby seal the first inner space and the second inner space. In this case, the movable section provided with the mirror is disposed in the inner space thus sealed, and thus, the deterioration of the drive characteristics and the optical characteristics due to the external moisture or the foreign matter can be prevented. Therefore, the reliability of the variable wavelength interference filter can be ensured. Further, since the movable section provided with the mirror can be disposed in the sealed space without using the package as a separate body, miniaturization and cost reduction can be achieved. Further, since the periphery of the bonded layer is sealed with the sealing member, the sealing quality can be ensured irrespective of the bonding method. Further, since the bonding of the substrates can be performed in both of the atmospheric pressure condition and the reduced-pressure condition, a variety of bonding methods such as one using a plasma-polymerized film, or one using a metal film can be adopted, and thus, the bonding quality between the substrates can be ensured.

APPLICATION EXAMPLE 2

In the variable wavelength interference filter according to the application example described above, it is preferable that the first gap and the second gap are sealed with the sealing member in a reduced-pressure state in which the pressure in the first inner space and the second inner space is lower than in the outside.

In this application example, the first gap and the second gap are sealed with the sealing member while keeping the first inner space and the second inner space in the reduced-pressure state. In this case, the movable section provided with the mirror is disposed in the inner space in the reduced-pressure state, and it is possible to prevent the air resistance from acting on the movable mirror when driving, and it is possible to improve the responsiveness of the movable mirror to thereby sufficiently ensure the responsiveness of the movable mirror.

APPLICATION EXAMPLE 3

In the variable wavelength interference filter according to the application example described above, it is preferable that there is further included a through hole, through which the first inner space and the second inner space communicate with each other, and the first gap and the second gap are each sealed with the sealing member.

In this application example, the second substrate is provided with a through hole, through which the first inner space and the second inner space communicate with each other, and the gaps between the substrates are sealed with the sealing member while keeping the inner spaces in the reduced-pressure state. In this case, since the first inner space and the second inner space communicate with each other through the through hole, the first inner space and the second inner space can be kept in the reduced-pressure state with the equal pressure. Therefore, the displacement of the movable mirror due to the pressure difference between the first inner space and the second inner space can be suppressed. Therefore, it is possible to improve the responsiveness of the movable mirror, and at the same time, to drive the movable mirror with accuracy.

APPLICATION EXAMPLE 4

In the variable wavelength interference filter according to the application example described above, it is preferable that the first substrate is provided with an extraction electrode for the displacing electrode, a first penetration section is disposed in an area of the second substrate overlapping the extraction electrodes in a plan view viewed from a thickness direction of the second substrate, a second penetration section is disposed in an area of the third substrate overlapping the extraction electrode in the plan view, a first sealing groove communicating with the first penetration section and the second penetration section is disposed along an outer circumferential portion of the first gap between the first substrate and the second substrate, a second sealing groove communicating with the first penetration section and the second penetration section is disposed along an outer circumferential portion of the second gap between the second substrate and the third substrate, and the first gap and the second gap are each sealed with the sealing member.

In this application example, the first substrate is provided with the extraction electrode for the displacing electrode, the first penetration section is formed in the area of the second substrate overlapping the extraction electrode in the plan view viewed in the substrate thickness direction, and the second penetration section is formed in the area of the third substrate overlapping the extraction electrode in the plan view viewed in the substrate thickness direction. Further, the first sealing groove and the second sealing groove communicating with the first penetration section and the second penetration section are disposed along the outer circumferential portion of each of the gaps, and the first inner space and the second inner space communicate with the outside via the first gap, the first sealing groove, the first penetration section, the second gap, the second sealing groove, and the second penetration section. Further, since the sealing member seals the first gap and the second gap between the substrates via the first penetration section, the second penetration section, the first sealing groove, and the second sealing groove, the respective inner spaces can be sealed in the reduced-pressure state. Therefore, it is possible to make the material of the sealing member efficiently penetrate into the gaps via the first penetration section, the second penetration section, the first sealing groove, and the second sealing groove, and thus the sealing quality can be ensured. Further, even in the state in which a plurality of elements is arranged in an array, it is possible to efficiently seal each of the gaps of each of the elements in a lump via the each of the penetration sections and each of the sealing grooves. Therefore, the manufacturing efficiency can be improved.

APPLICATION EXAMPLE 5

In the variable wavelength interference filter according to the application example described above, it is preferable that the sealing member is made of synthetic resin.

In this application example, the synthetic resin such as an adhesive manufactured using oil or the like as the raw material is used as the material of the sealing member, and the first gap and the second gap between the substrates are sealed after the bonding process of the substrates. On this occasion, by using the synthetic resin as the material of the sealing member, the sealing process can be performed in a variety of atmospheres. Therefore, it is possible to encapsulate the dry air or the gas such as nitrogen for preventing the deterioration of the mirror or the movable section. Further, since the sealing process can be performed at room temperature, the residual stress can be reduced, and thus, the driving accuracy of the movable mirror can be ensured. Therefore, the reliability of the variable wavelength interference filter can be ensured.

APPLICATION EXAMPLE 6

In the variable wavelength interference filter according to the application example described above, it is preferable that the sealing member is made of a para-xylylene polymer.

In this application example, a para-xylylene polymer (parylene) is used as the material of the sealing member, and by depositing the parylene film in the gaps between the substrates in the reduced-pressure state, the inner spaces are sealed in the reduced-pressure state after the bonding process of the substrates. Therefore, the inner spaces can be sealed in the reduced-pressure state irrespective of the bonding method. Therefore, the movable section provided with the mirror is disposed in the inner space in the reduced-pressure state, and it is possible to prevent the air resistance from acting on the movable mirror when driving, and it is possible to improve the responsiveness of the movable mirror to thereby sufficiently ensure the responsiveness of the movable mirror. Further, since the parylene is used as the material of the sealing member, it is possible to form the sealing member inside the fine gaps to thereby ensure the sealing length. Therefore, high sealing quality can be ensured. Further, since a plurality of elements can be sealed in a lump, the productivity can be improved. Further, the sealing member using parylene can be formed at room temperature, and can therefore suppress the stress applied to the variable wavelength interference filter and the deterioration of the mirrors caused by heat.

APPLICATION EXAMPLE 7

In the variable wavelength interference filter according to the application example described above, it is preferable that the sealing member is formed of an inorganic thin film.

In this application example, the sealing member formed of the inorganic thin film having a high sealing property is formed in the gaps between the substrates to thereby seal the inner spaces. Therefore, high sealing quality can be ensured.

APPLICATION EXAMPLE 8

This application example is directed to an optical module including a first substrate having a light transmissive property, a second substrate, which has a light transmissive property, and is opposed to the first substrate, and bonded to the first substrate, a third substrate having a light transmissive property, which is opposed to an opposite side of the second substrate to a side provided with the first substrate, and is bonded to the second substrate, a movable section provided to the second substrate, and having a movable surface opposed to the first substrate, a holding section provided to the second substrate, and adapted to hold the movable section so as to be able to move in a thickness direction of the second substrate, a pair of mirrors disposed respectively on the movable surface of the movable section and a surface of the first substrate opposed to the second substrate so as to be opposed to each other via a predetermined inter-mirror gap, an electrostatic actuator having a pair of displacing electrodes opposed to each other disposed respectively on the surfaces of the first substrate and the second substrate opposed to each other, and making the movable section be displaced in a substrate thickness direction due to an electrostatic attractive force in response to application of a predetermined voltage to the pair of displacing electrodes, and a detection section adapted to detect light, the first substrate and the second substrate are bonded to each other with a bonding layer, and the second substrate and the third substrate are bonded to each other with a bonding layer, a first inner space sandwiched by the first substrate and the second substrate, and a second inner space sandwiched by the second substrate and the third substrate are provided, a first gap, through which the first inner space communicates with the outside, is disposed between the first substrate and the second substrate, a second gap, through which the second inner space communicates with the outside, is disposed between the second substrate and the third substrate, a sealing member adapted to seal the first inner space and the second inner space is provided to each of the first gap and the second gap, the pair of mirrors constitute an optical interference region, and the detection section detects light taken out by the optical interference region.

In this application example, the movable section provided with the mirror is disposed in the inner space thus sealed, and thus, the deterioration of the drive characteristics and the optical characteristics due to the external moisture or the foreign matter can be prevented. Therefore, the reliability of the variable wavelength interference filter can be ensured. Therefore, also in the optical module, the detection of the measurement target light can stably be performed.

APPLICATION EXAMPLE 9

This application example is directed to an electronic apparatus including a first substrate having a light transmissive property, a second substrate, which has a light transmissive property, and is opposed to the first substrate, and bonded to the first substrate, a third substrate having a light transmissive property, which is opposed to an opposite side of the second substrate to a side provided with the first substrate, and is bonded to the second substrate, a movable section provided to the second substrate, and having a movable surface opposed to the first substrate, a holding section provided to the second substrate, and adapted to hold the movable section so as to be able to move in a thickness direction of the second substrate, a pair of mirrors disposed respectively on the movable surface of the movable section and a surface of the first substrate opposed to the second substrate so as to be opposed to each other via a predetermined inter-mirror gap, an electrostatic actuator having a pair of displacing electrodes opposed to each other disposed respectively on the surfaces of the first substrate and the second substrate opposed to each other, and making the movable section be displaced in a substrate thickness direction due to an electrostatic attractive force in response to application of a predetermined voltage to the pair of displacing electrodes, a first inner space sandwiched by the first substrate and the second substrate, a second inner space sandwiched by the second substrate and the third substrate, a first gap, through which the first inner space between the first substrate and the second substrate communicates with the outside, a second gap, through which the second inner space between the second substrate and the third substrate communicates with the outside, a sealing member adapted to seal each of the first gap and the second gap, a detection section adapted to detect light, and a control section adapted to control the electrostatic actuator.

In this present application example, the movable section provided with the mirror is disposed in the inner space thus sealed, and thus, the deterioration of the drive characteristics and the optical characteristics due to the external moisture or the foreign matter can be prevented. Therefore, the reliability of the variable wavelength interference filter can be ensured. Therefore, also in the electronic apparatus, the movable mirror can stably be moved by controlling the electrostatic actuator using the control section, and thus, the component intensity of the measurement target light can stably be analyzed.

APPLICATION EXAMPLE 10

This application example is directed to a variable wavelength interference filter including a first substrate, a second substrate, which is disposed so as to be opposed to the first substrate, and has a movable section and a holding section adapted to hold the movable section so as to be able to be displaced in a thickness direction of the first substrate, a third substrate disposed on an opposite surface of the second substrate to a surface, on which the first substrate is disposed, so as to be opposed to the second substrate, a first mirror disposed on a surface of the movable section opposed to the first substrate, a second mirror provided to the first substrate, and disposed so as to be opposed to the first mirror via a gap, and an actuator adapted to vary the gap, the first substrate and the second substrate are bonded to each other with a bonding layer, and the second substrate and the third substrate are bonded to each other with a bonding layer, a first recessed section is formed between the first substrate and the second substrate, a second recessed section is formed between the second substrate and the third substrate, and a sealing member is disposed in a first gap, through which the first recessed section communicates with an outside, and a second gap, through which the second recessed section communicates with the outside.

In this application example, the sealing member is disposed in the first gap formed between the first substrate and the second substrate, through which the first inner space sandwiched by the first substrate and the second substrate communicates with the outside, and the second gap formed between the second substrate and the third substrate, through which the second inner space sandwiched by the second substrate and the third substrate communicates with the outside, to thereby seal the first inner space and the second inner space. In this case, the movable section provided with the mirror is disposed in the inner space thus sealed, and thus, the deterioration of the drive characteristics and the optical characteristics due to the external moisture or the foreign matter can be prevented. Therefore, the reliability of the variable wavelength interference filter can be ensured. Further, since the movable section provided with the mirror can be disposed in the sealed space without using the package as a separate body, miniaturization and cost reduction can be achieved.

APPLICATION EXAMPLE 11

This application example is directed to a method of manufacturing a variable wavelength interference filter including: disposing a second substrate so as to be opposed to a first substrate having a first recessed section to form a first inner space formed of the first recessed section and a first gap, through which the first inner space communicates with an outside, between the first substrate and the second substrate, disposing a third substrate, which has a second recessed section, on an opposite surface of the second substrate to a surface, on which the first substrate is disposed, so as to be opposed to the second substrate to form a second inner space formed of the second recessed section and a second gap, through which the second inner space communicates with the outside, between the second substrate and the third substrate, obtaining a bonded body by bonding the first substrate and the second substrate to each other via a bonding layer and bonding the second substrate and the third substrate to each other via a bonding layer, and sealing the first gap and a second gap with a sealing member.

In this application example, by disposing the second substrate so as to be opposed to the first substrate having the first recessed section, the first inner space and the first gap through which the first inner space communicates with the outside are formed between the first substrate and the second substrate due to the first recessed section. Further, by disposing the third substrate having the second recessed section on the opposite surface of the second substrate to the surface, on which the first substrate is disposed, so as to be opposed to the second substrate, the second inner space and the second gap, through which the second inner space communicates with the outside, are formed between the second substrate and the third substrate due to the second recessed section. Further, by bonding the first substrate and the second substrate to each other via the bonding layer, and bonding the second substrate and the third substrate to each other via the bonding layer, the bonded body is obtained. Then, by sealing the first gap and the second gap with the sealing member, the variable wavelength interference filter with the inner spaces sealed can be manufactured. Since the process of bonding the substrates and the process of sealing the inner spaces are different, the inner space can be sealed irrespective of the bonding method of the substrates. Therefore, since the bonding method is not limited, a variety of bonding methods such as one using a plasma-polymerized film, or one using a metal film can be adopted, and thus, the bonding quality between the substrates can be ensured.

APPLICATION EXAMPLE 12

In the method of manufacturing a variable wavelength interference filter according to the application example described above, it is preferable that the method further includes: setting the first inner space and the second inner space to a reduced-pressure state.

In this application example, the first inner space and the second inner space are sealed with the sealing member in the reduced-pressure state. In this case, the movable section provided with the mirror is disposed in the inner space in the reduced-pressure state, and it is possible to prevent the air resistance from acting on the movable mirror when driving, and is possible to improve the responsiveness of the movable mirror to thereby sufficiently ensure the responsiveness of the movable mirror.

APPLICATION EXAMPLE 13

In the method of manufacturing a variable wavelength interference filter according to the application example described above, it is preferable that the bonded body having a plurality of variable wavelength interference filters arranged in an array, and the method further includes: providing a first penetration section, which communicates with the first gap, to the second substrate, providing a second penetration section, which communicates with the second gap, to the third substrate, providing a first sealing groove, through which the first gap and the first penetration section communicate with each other, to the first substrate, providing a second sealing groove, through which the second gap and the second penetration section communicate with each other, to the third substrate, and cutting the bonded body into segments corresponding respectively to the variable wavelength interference filters.

In this application example, in the state in which the variable wavelength interference filters are arranged in an array, the first penetration section communicating with the first gap is provided to the second substrate, the second penetration section communicating with the second gap is provided to the third substrate, the first sealing groove through which the first gap and the first penetration section communicate with each other is provided to the first substrate, the second sealing groove through which the second gap and the second penetration section communicate with each other is provided to the third substrate, and then the first substrate and the second substrate, and the second substrate and the third substrate are bonded to each other via the bonding layer, respectively. Then, by forming the sealing member in each of the first gap and the second gap via the first penetration section, the second penetration section, the first sealing groove, and the second sealing groove, and then cutting the bonded body into segments corresponding respectively to the variable wavelength interference filters, the variable wavelength interference filters each having the inner spaces sealed can be manufactured.

Since the variable wavelength interference filters can be manufactured in a lump as an array, the manufacturing efficiency can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention will hereinafter be explained with reference to the accompanying drawings. It should be noted that in each of the drawings described below, the scale sizes of the layers and the members are made different from the actual dimensions in order to make the layers and the members have recognizable dimensions.

First Embodiment

A first embodiment of the invention will hereinafter be explained with reference to the accompanying drawings.

Configuration of Spectroscopic Measurement Device

Figure 1:
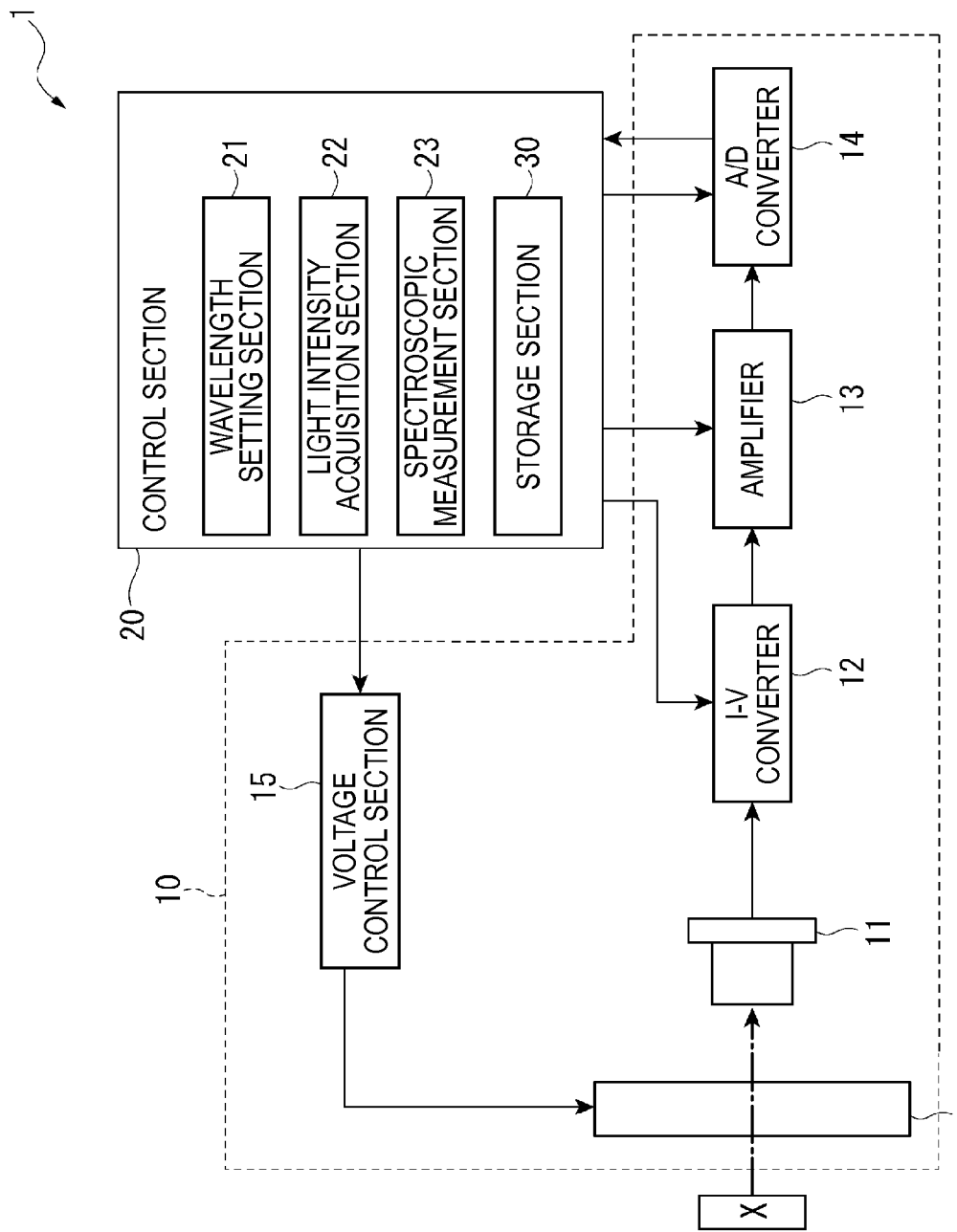
FIG. 1 is a block diagram showing a schematic configuration of a spectroscopic measurement device according to a first embodiment of the invention.

FIG. 1 is a block diagram showing a schematic configuration of a spectroscopic measurement device according to the first embodiment.

The spectroscopic measurement device 1 is a device for analyzing the light intensity of each wavelength in measurement target light having been reflected by, for example, a measurement target X to thereby measure the dispersion spectrum of the measurement target light. It should be noted that although in the present embodiment, the example of measuring the measurement target light reflected by the measurement target X is described, in the case of using a light emitting body such as a liquid crystal panel as the measurement target X, it is possible to use the light emitted from the light emitting body as the measurement target light.

Further, as shown in FIG. 1, the spectroscopic measurement device 1 is provided with an optical module 10, and a control section 20 for processing a signal output from the optical module 10.

Configuration of Optical Module

The optical module 10 is provided with a variable wavelength interference filter 5, a detector 11, an I-V converter 12, an amplifier 13, an A/D converter 14, and a voltage control section 15.

The optical module 10 guides the measurement target light reflected by the measurement target X to the variable wavelength interference filter 5 via an incident optical system (not shown), and then receives the light, which has been transmitted through the variable wavelength interference filter 5, using the detector 11. Then, a detection signal output from the detector 11 is output to the control section 20 via the I-V converter 12, the amplifier 13, and the A/D converter 14.

Configuration of Variable Wavelength Interference Filter

Then, the variable wavelength interference filter to be incorporated in the optical module will be explained.

Figure 2:
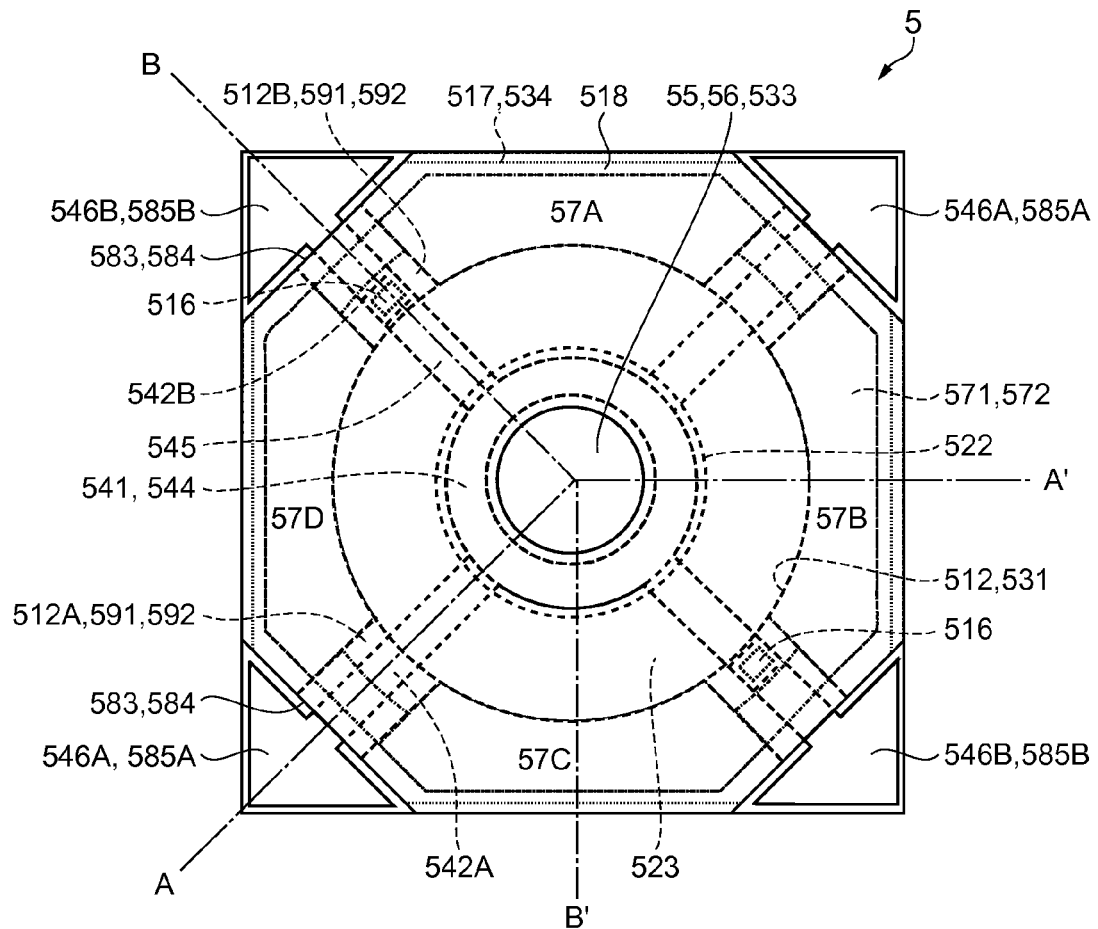
FIG. 2 is a plan view showing a schematic configuration of the variable wavelength interference filter according to the first embodiment.
Figure 3:
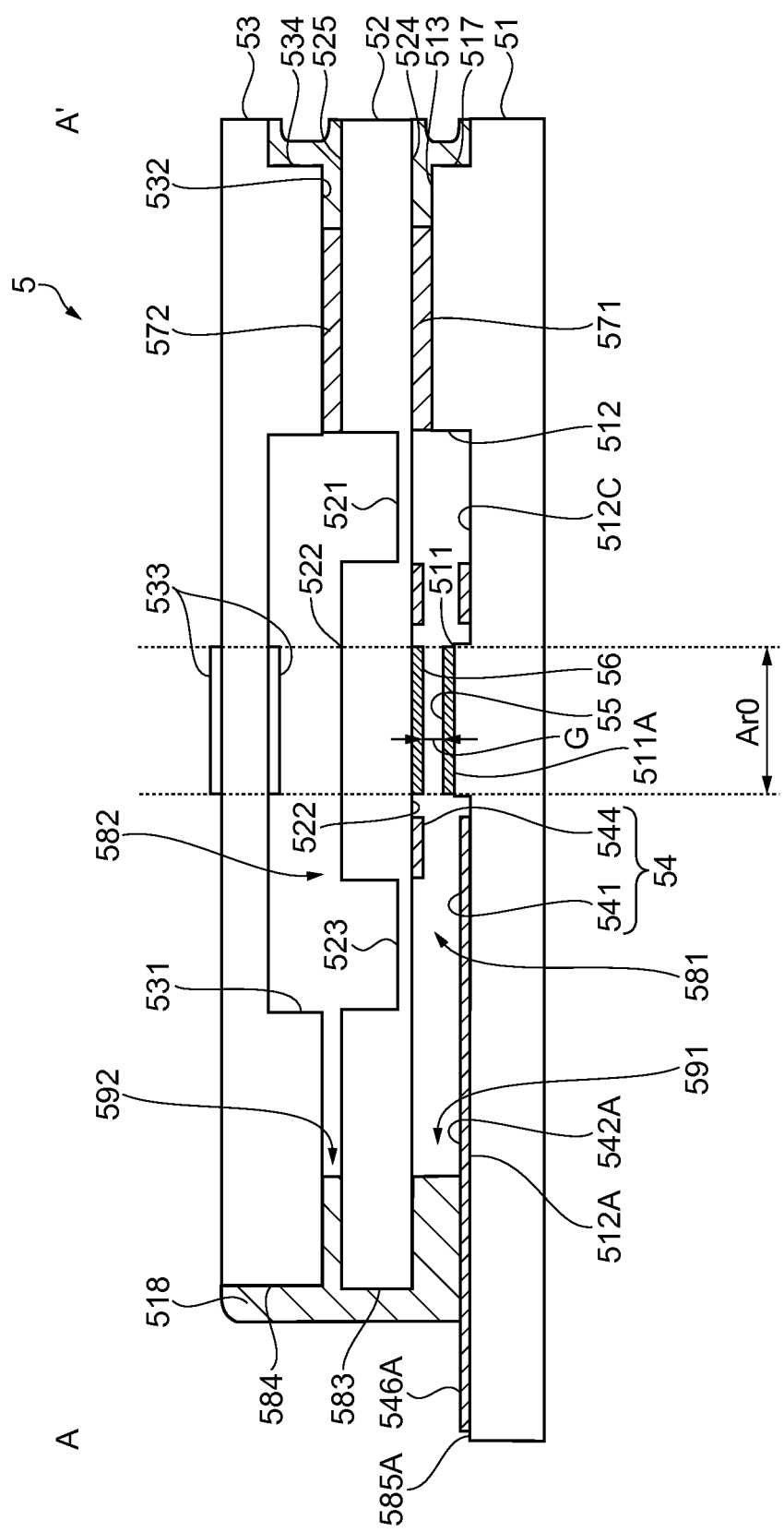
FIG. 3 is a cross-sectional view of the variable wavelength interference filter shown in FIG. 2 along the A-A' line.
Figure 4:
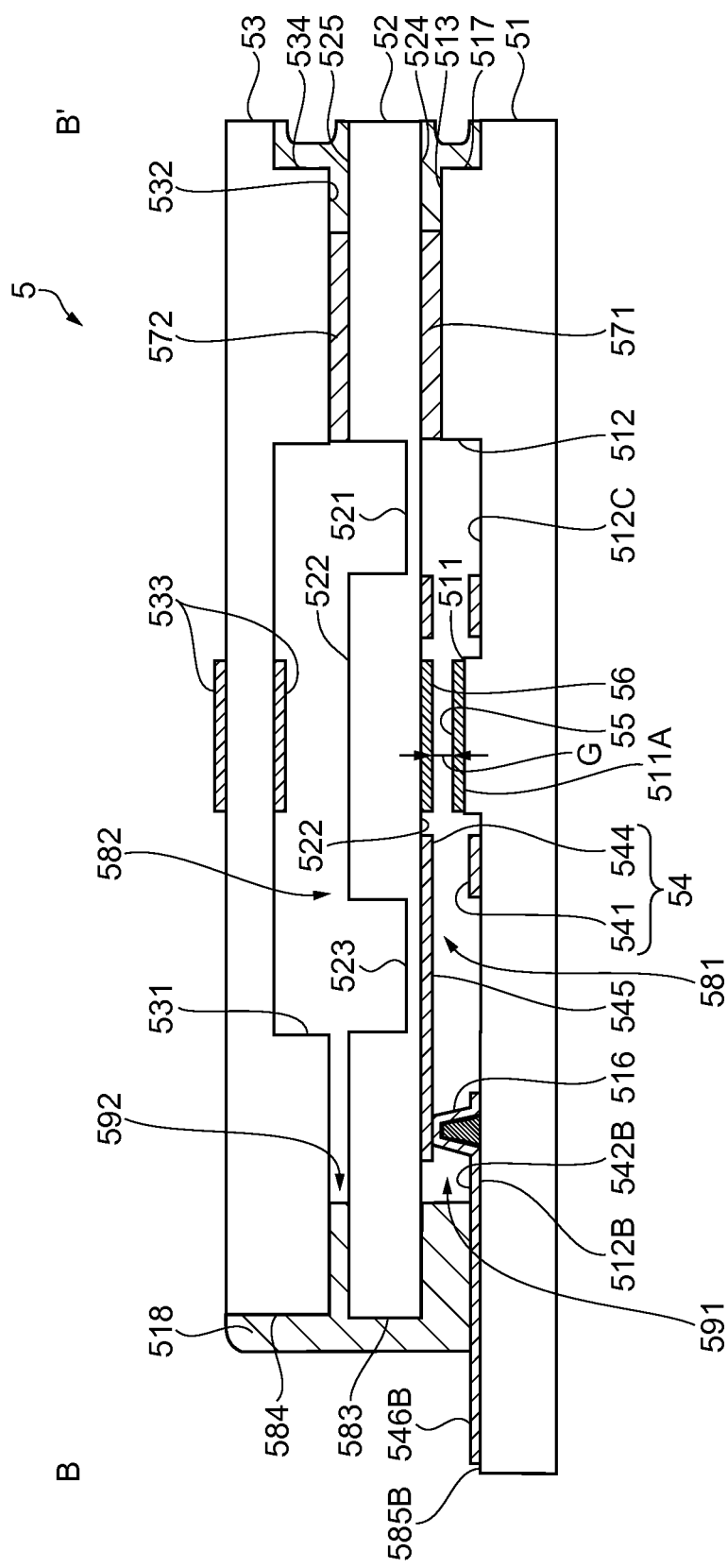
FIG. 4 is a cross-sectional view of the variable wavelength interference filter shown in FIG. 2 along the B-B' line.

FIG. 2 is a plan view showing a schematic configuration of the variable wavelength interference filter 5. FIG. 3 is a cross-sectional view of the variable wavelength interference filter 5 shown in FIG. 2 along the A-A' line. FIG. 4 is a cross-sectional view of the variable wavelength interference filter 5 shown in FIG. 2 along the B-B' line.

As shown in FIG. 2, the variable wavelength interference filter 5 is a plate-like optical member having a square planar shape formed to be, for example, 10 mm on a side. As shown in FIGS. 3 and 4, the variable wavelength interference filter 5 is provided with a first substrate 51, a second substrate 52, and a third substrate 53. These three substrates 51, 52, and 53 are each made of glass of various types such as soda glass, crystalline glass, quartz glass, lead glass, potassium glass, borosilicate glass, or alkali-free glass, or quartz crystal, for example. Among these materials, a glass containing alkali metal such as sodium (Na) or potassium (K) is preferable for the constituent material of each of the substrates 51, 52, and 53, and by making the substrates 51, 52, and 53 from such glass, it becomes possible to enhance the adhesiveness of a stationary mirror 55 and a movable mirror 56 described later, and electrodes, and the bonding strength between the substrates. Further, these three substrates 51, 52, and 53 are integrally configured by bonding surfaces 513, 524, 525, and 532 in bonding areas 57A, 57B, 57C, and 57D being bonded to each other with bonding layers 571, 572 in a plan view viewed from a thickness direction of the substrates.

Further, the stationary mirror 55 and the movable mirror 56 constituting a pair of mirrors according to the invention are disposed between the first substrate 51 and the second substrate 52. Here, the stationary mirror 55 is fixed to a surface of the first substrate 51 opposed to the second substrate 52, and the movable mirror 56 is fixed to a surface of the second substrate 52 opposed to the first substrate 51. Further, the stationary mirror 55 and the movable mirror 56 are disposed so as to opposed to each other via an inter-mirror gap G. Further, an electrostatic actuator 54 for controlling the dimension of the inter-mirror gap G between the stationary mirror 55 and the movable mirror 56 is disposed between the first substrate 51 and the second substrate 52.

Configuration of First Substrate

Figure 5:
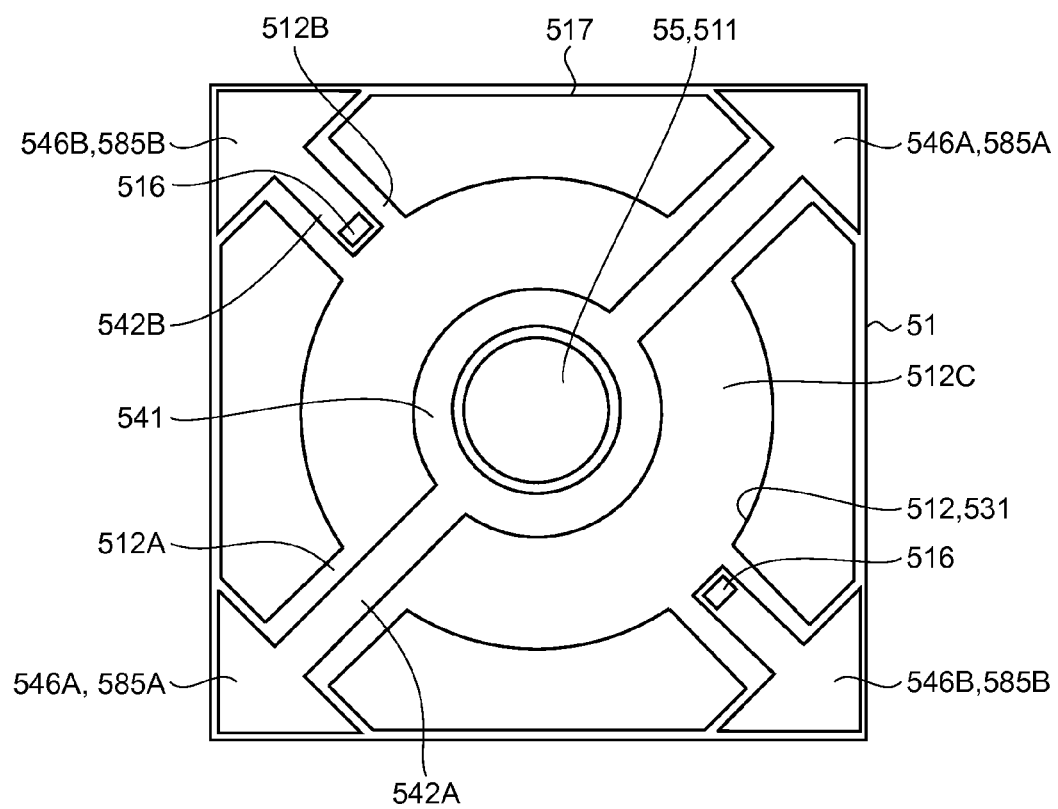
FIG. 5 is a plan view of a first substrate of the first embodiment viewed from a second substrate side.

FIG. 5 is a plan view of the first substrate 51 viewed from the second substrate 52 side.

The first substrate 51 is formed by processing a glass substrate, which is formed to have a thickness of, for example, 1 mm, using an etching process. Specifically, as shown in FIGS. 2, 3, and 4, the first substrate 51 is provided with a mirror fixation section 511 and an electrode formation groove 512 formed by etching.

The mirror fixation section 511 is formed to have a circular shape centered on the planar center point in a plan view of the first substrate 51 viewed from the thickness direction of the first substrate 51. The electrode formation groove 512 is formed to have a circular shape concentric with the mirror fixation section 511 and having a diameter dimension larger than that of the mirror fixation section 511.

The mirror fixation section 511 is formed by etching the first substrate 51 from the surface thereof to have a depth of, for example, 500 nm. The depth dimension of the mirror fixation section 511 is appropriately set in accordance with the dimension of the inter-mirror gap G between the stationary mirror 55 fixed to the surface (a mirror fixation surface 511A) of the mirror fixation section 511 and the movable mirror 56 formed on the second substrate 52, and the thickness dimensions of the stationary mirror 55 and the movable mirror 56. Further, it is preferable that the depth of the mirror fixation section 511 is designed taking the wavelength range of the light to be transmitted through the variable wavelength interference filter 5 into consideration.

Further, the stationary mirror 55 formed to have the circular shape is fixed to the mirror fixation surface 511A. The stationary mirror 55 is a metal alloy film made of, for example, an Ag alloy or an Al alloy, with which a high reflectance can be obtained, and is formed on the mirror fixation section 511 by a process such as sputtering.

It should be noted that although in the present embodiment the metal alloy film made of, for example, the Ag alloy or the Al alloy is used as the stationary mirror 55, the material of the stationary mirror 55 is not limited to these films, but a configuration of using the stationary mirror formed of, for example, a dielectric multilayer film such as an $SiO_2$—$TiO_2$ film or an AgC single layer film can also be adopted.

The electrode formation groove 512 is formed by etching the first substrate 51 from the surface thereof to have a depth of, for example, 1 μm. The electrode formation groove 512 is provided with an electrode fixation bottom surface 512C having a ring-like shape formed between an outer circumferential edge of the mirror fixation section 511 and an internal circumferential wall surface of the electrode formation groove 512, and the electrode fixation bottom surface 512C is provided with a first displacing electrode 541. Further, the first substrate 51 is provided with first electrode wiring grooves 512A and second electrode wiring grooves 512B each having the same depth dimension as that of the electrode fixation bottom surface 512C. The first electrode wiring grooves 512A and the second electrode wiring grooves 512B are formed to extend from the outer circumferential edge of the electrode formation groove 512 in the directions from the planer center point toward first electrode extraction sections 585A and second electrode extraction sections 585B, respectively.

The first electrode wiring grooves 512A and the first electrode extraction sections 585A are provided with first displacing electrode wiring lines 542A each extending from a part of the outer circumferential edge of the first displacing electrode 541 and first displacing extraction electrodes 546A, respectively. The first displacing electrode 541, the first displacing electrode wiring lines 542A, and the first displacing extraction electrodes 546A are each formed using an Au/Cr film (a film having a chromium film as a foundation and a gold film formed on the chromium film), and formed to have a thickness of, for example, 100 nm by a process such as sputtering.

It should be noted that although in the present embodiment, the Au/Cr film is used as the first displacing electrode 541 and the first displacing electrode wiring lines 542A, the films are not limited to the above, but other metals or indium tin oxide (ITO) can also be used.

The second electrode wiring grooves 512B are each provided with a bump electrode 516, which has resin such as polyimide as a core and is plated with gold or the like, formed at a position opposed to a second displacing electrode upper wiring line 545, which extends from a part of the outer circumferential edge of a second displacing electrode 544, and a second displacing electrode lower wiring line 542B extending from the bump electrode 516 to a second electrode extraction section 585B. Further, the second electrode extraction sections 585B are each provided with a second displacing extraction electrode 546B.

The second displacing electrode 544, the second displacing electrode upper wiring lines 545, the second displacing electrode lower wiring lines 542B, and second displacing extraction electrodes 546B are each formed using an Au/Cr film (a film having a chromium film as a foundation and a gold film formed on the chromium film), and formed to have a thickness of, for example, 100 nm by a process such as sputtering.

It should be noted that although in the present embodiment, the Au/Cr film is used as the second displacing electrode 544, the second displacing electrode upper wiring lines 545, the second displacing electrode lower wiring lines 542B, and the second displacing extraction electrodes 546B, the films are not limited to the above, but other metals or indium tin oxide (ITO) can also be used. Further, although in the present embodiment, the bump electrode having the resin such as polyimide as a core and plated with gold or the like is used as the bump electrode 516, the material is not limited to the above, but other metals formed to have a convex shape by plating or the like can also be used.

Further, the first substrate 51 is provided with first sealing grooves (a first sealing groove according to the invention) 517 connecting the first electrode extraction sections 585A and the second electrode extraction sections 585B to each other.

Configuration of Second Substrate

Figure 6:
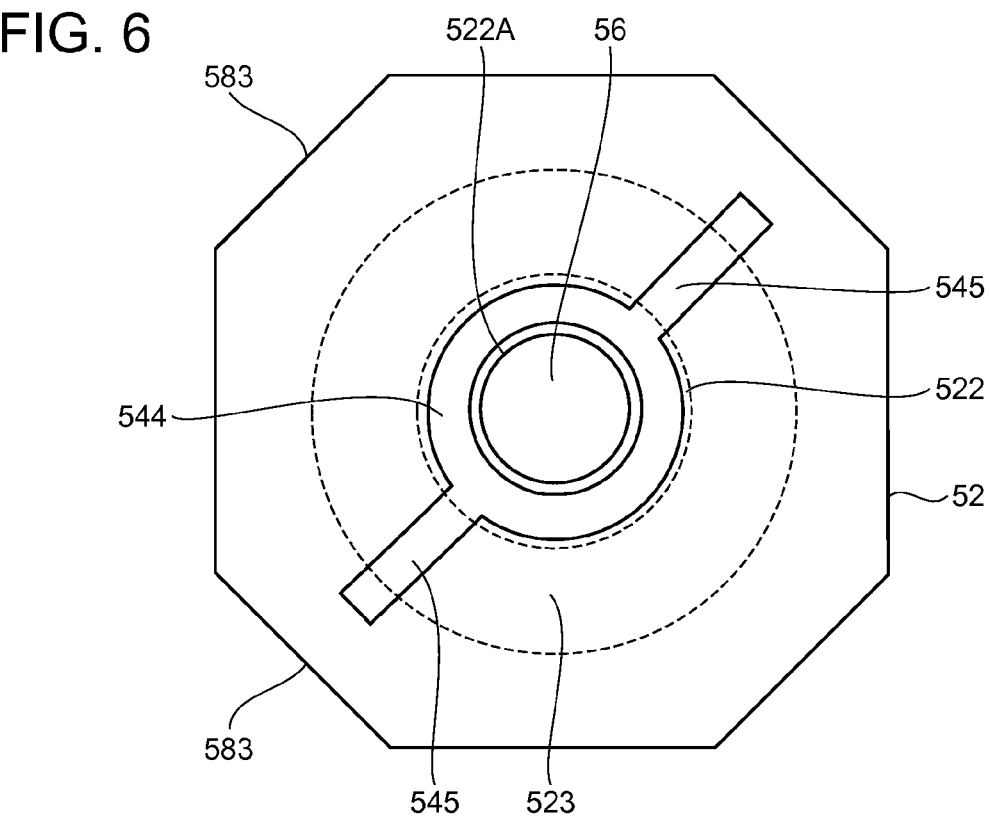
FIG. 6 is a plan view of the second substrate of the first embodiment viewed from the first substrate side.

FIG. 6 is a plan view of the second substrate 52 viewed from the first substrate 51 side.

The second substrate 52 is formed by processing a glass substrate, which is formed to have a thickness of, for example, 600 μm, using an etching process.

Specifically, as shown in FIGS. 2, 3, and 4, the second substrate 52 is provided with a displacement section 521 formed by etching. The displacement section 521 is provided with a movable section 522 having a circular shape centered on the planer center point in a plan view of the second substrate 52 viewed from the thickness direction of the second substrate 52, and a holding section 523 coaxial with the movable section 522, and for holding the movable section 522.

The second substrate 52 is provided with first penetration sections 583 formed at areas overlapping the first electrode extraction sections 585A or the second electrode extraction sections 585B in a plan view by cutting parts of the second substrate 52 using etching, laser, and so on.

The movable section 522 is formed to have a thickness dimension larger than that of the holding section 523, and is formed in the present embodiment, for example, to have the thickness dimension of 600 µm, which is the same dimension as the thickness dimension of the second substrate 52. Further, the movable section 522 is formed to have a columnar shape with a diameter dimension roughly the same as the diameter dimension of the mirror fixation section 511. Further, the movable section 522 is provided with a movable surface 522A parallel to the mirror fixation surface 511, and the movable mirror 56 is fixed to the movable surface 522A. Here, the movable mirror 56 and the stationary mirror 55 described above constitute the pair of mirrors according to the invention.

The movable mirror 56 is formed to have a circular shape similarly to the stationary mirror 55. Further, the same thin film as that of the stationary mirror 55 is used as the movable mirror 56, and in the present embodiment, a metal alloy film made of, for example, an Ag alloy or an Al alloy is used.

The holding section 523 is a diaphragm surrounding the periphery of the movable section 522, and is formed to have a thickness dimension of, for example, 30 µm. Further, the surface of the holding section 523 opposed to the first substrate 51 is provided with a second displacing electrode 544 having a ring-like shape and opposed to the first displacing electrode 541 with an electrostatic gap. Here, the electrostatic gap is determined by the depth dimension of the electrode formation groove 512 of the first substrate 51, the thickness of each of the displacing electrodes 541, 544, and the thickness of the bonding layer 571. Further, the second displacing electrode 544 and the first displacing electrode 541 described above correspond to a pair of displacing electrodes according to the invention, and constitute the electrostatic actuator 54 according to the invention.

Further, the second displacing electrode upper wiring lines 545 are formed so as to extend from respective parts of the outer circumferential edge of the second displacing electrode 544 toward two vertexes of the second substrate 52 having a square planar shape, more specifically, toward the upper left vertex and the lower right vertex in the plan view shown in FIG. 2, respectively.

It should be noted that although in the present embodiment, the second displacing electrode 544 and the second displacing electrode upper wiring lines 545 are each formed using the Au/Cr film similarly to the first displacing electrode 541 and the first displacing extraction electrodes 542, the films are not limited to the above, but other metals or ITO can also be used.

When the second substrate 52 and the first substrate 51 having such a configuration are bonded to each other, the second displacing electrode upper wiring lines 545 abut respectively on the bump electrodes 516 provided to the first substrate 51, and the abutting state is maintained. In other words, the second displacing electrode upper wiring lines 545 are connected to the second displacing extraction electrodes 546B via the bump electrodes 516 and the second displacing electrode lower wiring lines 542B, respectively. Thus, the electrical conduction from the second displacing electrode upper wiring lines 545 to the second displacing extraction electrodes 546B is ensured. The second displacing extraction electrodes 546B and the first displacing extraction electrodes 546A are connected to, for example, the voltage control section 15 of the optical module 10, and the voltage control section 15 applies a predetermined voltage between the first displacing electrode 541 and the second displacing electrode 544. Thus, the first displacing electrode 541 and the second displacing electrode 544 are pulled to each other due to the electrostatic attractive force, and thus, the holding section 523 bends to displace the movable section 522 toward the first substrate 51. By controlling the voltage applied between the first displacing electrode 541 and the second displacing electrode 544, the inter-mirror gap G between the movable mirror 56 of the movable section 522 and the stationary mirror 55 of the first substrate 51 is controlled, and it becomes possible to disperse the light with the wavelength corresponding to the inter-mirror gap G.

Configuration of Third Substrate

Figure 7:
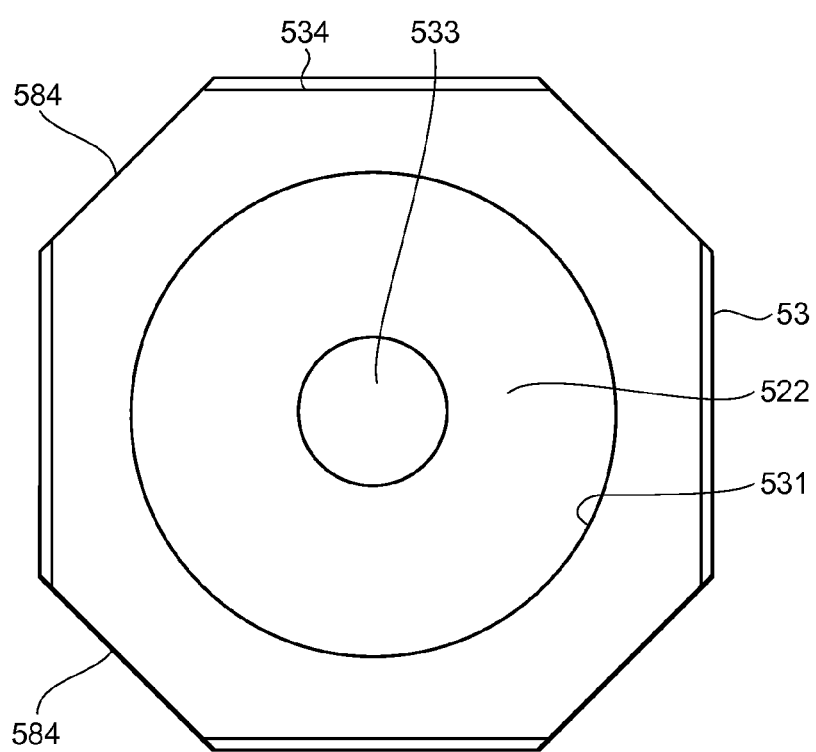
FIG. 7 is a plan view of a third substrate of the first embodiment viewed from the second substrate side.

FIG. 7 is a plan view of the third substrate 53 viewed from the second substrate 52 side.

Similarly to the first substrate 51 and the second substrate 52 described above, the third substrate 53 is formed by processing a glass substrate, which is formed to have a thickness of, for example, 1 mm, using an etching process. Specifically, the third substrate 53 is provided with a gap formation groove 531 opposed to the displacement section 521 of the second substrate 52 and having the same diameter dimension as that of the displacement section 521.

Further, the third substrate 53 is provided with second penetration sections 584 formed in the areas overlapping the first electrode extraction sections 585A or the second electrode extraction sections 585B in a plan view, namely the four corners of the square planar shape of the variable wavelength interference filter 5, by removing a part of the third substrate 53 using a diamond drill, sandblast, or the like. Further, the third substrate 53 is provided with a second sealing groove 534 according to the invention for connecting the second penetration sections 584.

Further, on both surfaces of the third substrate 53, there is formed an optical film 533 for reflecting or absorbing the light with wavelengths out of a specific range so as to be concentric with the stationary mirror 55 and the movable mirror 56. The measurement target light having entered the optical module 10 enters the movable section 522 of the second substrate 52 through the optical film 533.

As shown in FIG. 3, the first substrate 51, the second substrate 52, and the third substrate 53 described above are formed as an integrated configuration by bonding the bonding surfaces 513, 524, 525, and 532 of the bonding areas 57A, 57B, 57C, and 57D formed on the outer circumferential side of the displacement section 521. In this case, a first gap 591 and a second gap 592, where the bonding surfaces 513, 524, and the bonding surfaces 525, 532 are not bonded to each other, are formed therebetween. The first gap 591 and the second gap 592 are sealed by a sealing member 518 keeping a first inner space 581 between the first substrate 51 and the second substrate 52 and a second inner space 582 between the second substrate 52 and the third substrate 53 in a reduced-pressure state. As the material of the sealing member 518, there is used parylene C, parylene N, parylene D, or parylene HT as para-xylylene polymer (parylene), an inorganic thin film deposited by an ALD method or a CVD method such as $SiO_2$, SiN, or $Al_2O_3$, or resin such as epoxy resin, polyimide resin, polyethylene, polyethylene terephthalate, vinylidene chloride, polyvinyl alcohol, nylon, or ethylene vinyl alcohol.

Configuration of Detection Section

Going back to FIG. 1, the detector 11 of the optical module 10 will be explained.

The detector 11 receives (detects) the light having been transmitted through an optical interference region Ar0 of the variable wavelength interference filter 5, and then outputs a detection signal based on the received light intensity.

Configuration of I-V Converter, Amplifier, A/D Converter, and Voltage Control Section The I-V converter 12 converts the detection signal input from the detector 11 into a voltage value, and then outputs the voltage value to the amplifier 13.

The amplifier 13 amplifies the voltage (the detection voltage), which corresponds to the detection signal, and is input from the I-V converter 12.

The A/D converter 14 converts the detection voltage (an analog signal) input from the amplifier 13 into a digital signal, and then outputs the digital signal to the control section 20.

The voltage control section 15 applies a voltage to the electrostatic actuator 54 of the variable wavelength interference filter 5 based on the control by the control section 20. Thus, the electrostatic attractive force is generated between the first displacing electrode 541 and the second displacing electrode 544 of the electrostatic actuator 54, and the movable section 522 is displaced toward the first substrate 51 to thereby set the inter-mirror gap G to a predetermined value.

Configuration of Control Section

Then the control section 20 of the spectroscopic measurement device 1 will be explained.

The control section 20 is configured by combining, for example, a CPU and a memory with each other, and controls an overall operation of the spectroscopic measurement device 1. As shown in FIG. 1, the control section 20 is provided with a wavelength setting section 21, a light intensity acquisition section 22, and a spectroscopic measurement section 23.

Further, the control section 20 is provided with a storage section 30 for storing a variety of types of data, and the storage section 30 stores V-λ data for controlling the electrostatic actuator 54. As the V-λ data, there is recorded the peak wavelength of the light to be transmitted through the variable wavelength interference filter 5 corresponding to the voltage to be applied to the electrostatic actuator 54.

The light intensity acquisition section 22 obtains the light intensity detected by the detector 11, and then stores the light intensity into the storage section 30.

The spectroscopic measurement section 23 measures the dispersion spectrum of the measurement target light based on the light intensity corresponding to each of the wavelengths obtained and then stored in the storage section 30 by the light intensity acquisition section 22.

Method of Manufacturing Variable Wavelength Interference Filter

Then, a method of manufacturing such a variable wavelength interference filter as described above will be explained.

Firstly, the substrates 51, 52, and 53 described above are formed. It should be noted that the first substrate 51 and the third substrate 53 are each formed to have a thickness with which the rigidity as high as to prevent the substrate from bending in the case of setting the first inner space 581 and the second inner space 582 to the reduced-pressure state.

Then, the substrates 51, 52, and 53 are bonded to each other. Here, as each of the bonding layers 571, 572 for bonding the bonding surfaces 513, 524, 525, and 532, a plasma-polymerized film, for example, is used. Specifically, the substrates 51, 52, and 53 are bonded to each other by forming plasma-polymerized film in the bonding areas 57A, 57B, 57C, and 57D of the bonding surfaces 513, 524, 525, and 532 of the substrates 51, 52, and 53 in the plan view using a plasma polymerization process or the like, then irradiating the plasma-polymerized films with a ultraviolet lay or performing a plasma process, and then making the substrates 51, 52, and overlap each other. It is preferable for the plasma-polymerized films to use polyorganosiloxane as a principal material, and the average thickness of each of the plasma-polymerized films is in a range from about 10 nm to about 100 nm.

By performing activated bonding using the plasma-polymerized films with siloxane, the plasma-polymerized films can easily be bonded using ultraviolet irradiation or a plasma process without depending on the temperature. Further, by using the plasma-polymerized films with siloxane, preferable adhesiveness is exhibited, and high bonding strength can be obtained regardless of the material of the substrate used as the substrates 51, 52, and 53.

It should be noted that in the bonding of the substrates 51, 52, and 53, a bonding method using an adhesive thin film (an adhesive) or a bonding method using a metal film, for example, can also be used besides the bonding method described above.

Sealing Process

FIGS. 8A through 8E are diagrams showing a sealing and chip formation process performed after bonding the substrates 51, 52, and 53. Here, a manufacturing method of forming each of the substrates 51, 52, and 53 in a single base material, then bonding the base materials to each other, and finally segmenting the base materials into discrete variable wavelength interference filters will be explained.

Figure 8A:
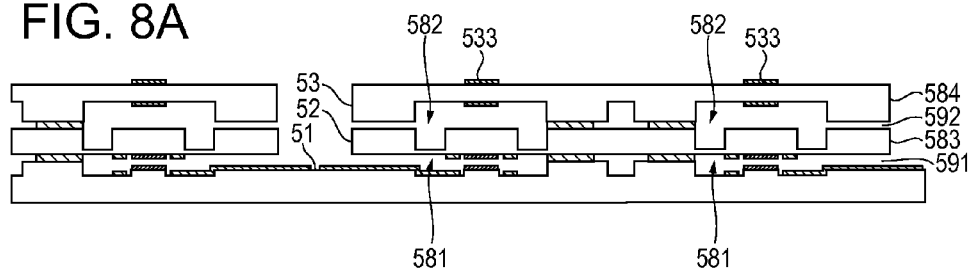
FIGS. 8A through 8E are diagrams showing a manufacturing process according to the first embodiment after a bonding process.
Figure 8B:
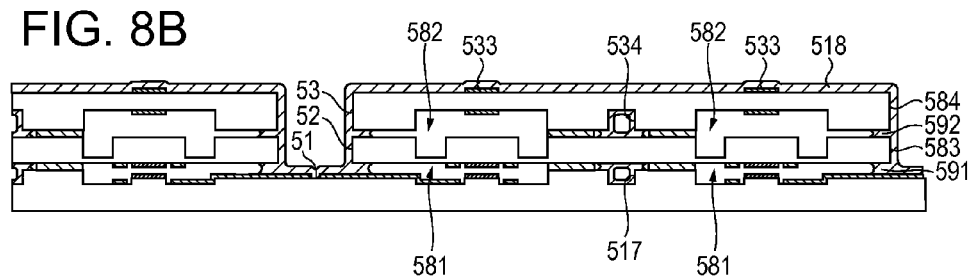

FIG. 8A shows the state in which the substrates 51, 52, and 53 are bonded to each other. After bonding the substrates 51, 52, and 53 to each other, the air in the first inner space 581 and the second inner space 582 is suctioned through the first and second gaps 591, 592 by a suction device such as a vacuum pump to set the first inner space 581 and the second inner space 582 to the reduced-pressure state with the pressure lower than the atmospheric pressure. Then, in the state in which the pressure in the first inner space 581 and the second inner space 582 is reduced, the first and second gaps 591, 592 are sealed with the sealing member 518 (FIG. 8B). In this case, para-xylylene polymer (parylene), for example, is used as the sealing member 518. Regarding parylene, a uniform parylene thin film is deposited at room temperature on the surface of the variable wavelength interference filter 5 by putting the variable wavelength interference filter 5 in a vacuum chamber, and then introducing a parylene monomer gas. Since the parylene film is deposited in a fine gap, the parylene film is also deposited inside the first and second gaps 591, 592 via the first penetration sections 583, the first sealing groove 517, the second penetration sections 584, and the second sealing groove 534 to thereby form the sealing member 518. Thus, the first and second gaps 591, 592 are sealed. On this occasion, since the deposition of the parylene film is performed in the reduced-pressure state, the first inner space 581 and the second inner space 582 in the inside of the variable wavelength interference filter 5 are sealed in the reduced-pressure state. As the parylene film, parylene C having chlorine as the substituent is preferably used, and the average film thickness is in a range from about 10 nm to about 100 μm.

It should be noted that although in the present embodiment, the first inner space 581 and the second inner space 582 are sealed in the reduced-pressure state, the pressure is not limited to the reduced pressure, but it is also possible to seal the spaces in an atmospheric pressure state using an adhesive or the like.

Figure 8C:
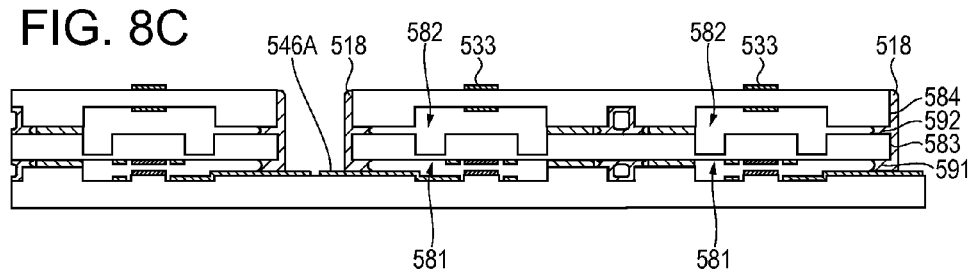

After performing the sealing with the sealing member 518, anisotropic etching is performed in the thickness direction of the substrates using a plasma process such as reactive ion etching (RIE) to thereby remove the sealing member 518 deposited on a surface perpendicular to the thickness direction of the substrates on the periphery of the variable wavelength interference filter 5, and the sealing member 518 deposited on the first displacing extraction electrodes 546A, the second displacing extraction electrodes 546B, and the optical film 533 (FIG. 8C). For example, in the case of using parylene film as the sealing member 518, the sealing member 518 can be removed by the plasma process using $O_2$ gas.

Figure 8D:
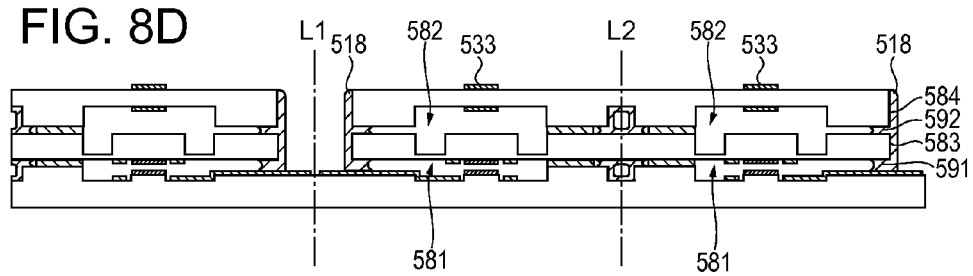
Figure 8E:
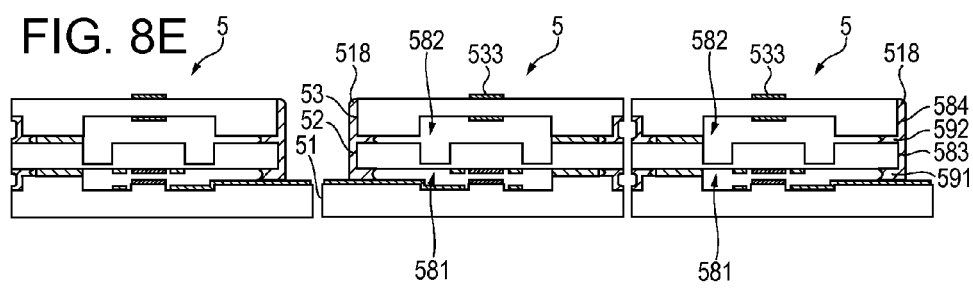

After removing the sealing member 518 on the first displacing extraction electrodes 546A, the second displacing extraction electrodes 546B, and the optical film 533, segmentation is performed by cutting the substrates along cutting lines L1, L2 indicated by dotted lines in FIG. 8D to thereby form the chips (FIG. 8E). On this occasion, dicing, a laser, a scriber, and so on can be used for the segmentation.

Functions and Advantages of First Embodiment

As described above, in the variable wavelength interference filter 5 according to the first embodiment described above, the first gap 591 and the second gap 592, where the bonding surfaces 513 and 524, 525 and 532 are not bonded to each other, are formed between the bonding surfaces 513, 524, and between the bonding surfaces 525, 532, respectively. Further, the gaps communicate with the first inner space 581 between the first substrate 51 and the second substrate 52 of the variable wavelength interference filter 5, the second inner space 582 between the second substrate 52 and the third substrate 53, and the outside. Therefore, by sealing the first gap 591 and the second gap 592 with the sealing member 518, the first inner space 581 and the second inner space 582 can airtightly be sealed. Thus, since the stationary mirror 55, the movable mirror 56, and the movable section 522 are disposed in the first inner space 581 and the second inner space 582 thus airtightly sealed, the deterioration of the drive characteristics and the optical characteristics due to the external moisture or a foreign matter can be prevented. Therefore, the reliability of the variable wavelength interference filter 5 can be ensured. Further, since the package as a separate member is not used, miniaturization and cost reduction can be achieved. Further, in the optical module 10 and the spectroscopic measurement device 1 each using such a variable wavelength interference filter 5, since the reliability of the variable wavelength interference filter 5 can be ensured, it is possible to stably receive the measurement target light and stably analyze the intensity of each of the components of the measurement target light.

Further, since it is possible to set the first inner space 581 and the second inner space 582 to the reduced-pressure state with the pressure lower than the atmospheric pressure via the first gap 591 and the second gap 592, the first inner space 581 and the second inner space 582 can be sealed in the reduced-pressure state after bonding the substrates 51, 52, and 53 to each other. Therefore, since the movable section 522 provided with the movable mirror 56 can be disposed between the first inner space 581 and the second inner space 582 each set to the reduced-pressure state, the air resistance can be prevented from acting on the movable mirror 56 when driving the movable mirror 56. Therefore, the responsiveness of the movable mirror 56 can be improved to thereby sufficiently ensure the responsiveness of the movable mirror 56.

Further, since the bonding of the substrates 51, 52, and 53 can be performed in the atmospheric pressure condition, the bonding method using a plasma-polymerized film, a metal film, and so on can be adopted, and thus, the bonding quality between the substrates 51, 52, and 53 can be ensured. In particular, the plasma-polymerized film as an example of the bonding layers 571, 572 can absorb the unevenness of the surfaces of the substrates 51, 52, and 53, and can therefore bond the substrates 51, 52, and 53 to each other with preferable bonding quality.

Further, a thin film deposition process of, for example, parylene, $SiO_2$, SiN, and $Al_2O_3$ can be used for the sealing process, and thus, a plurality of variable wavelength interference filter 5 can airtightly be sealed in a lump in a wafer state. Therefore, the production efficiency can be improved, and thus, the cost reduction is possible.

Further, the parylene film as an example of the sealing member 518 can be deposited in the fine gap, and it is possible to form the sealing member deep in the gap. Therefore, the sealing length can be elongated to thereby obtain preferable sealing quality. Further, parylene C has a preferable gas-barrier property, and can therefore further improve the sealing quality. Further, the parylene film can be deposited at room temperature, and can therefore suppress the stress applied to the variable wavelength interference filter and the deterioration of the mirrors caused by heat.

Second Embodiment

Then, a variable wavelength interference filter according to a second embodiment of the invention will be explained.

Figure 9:
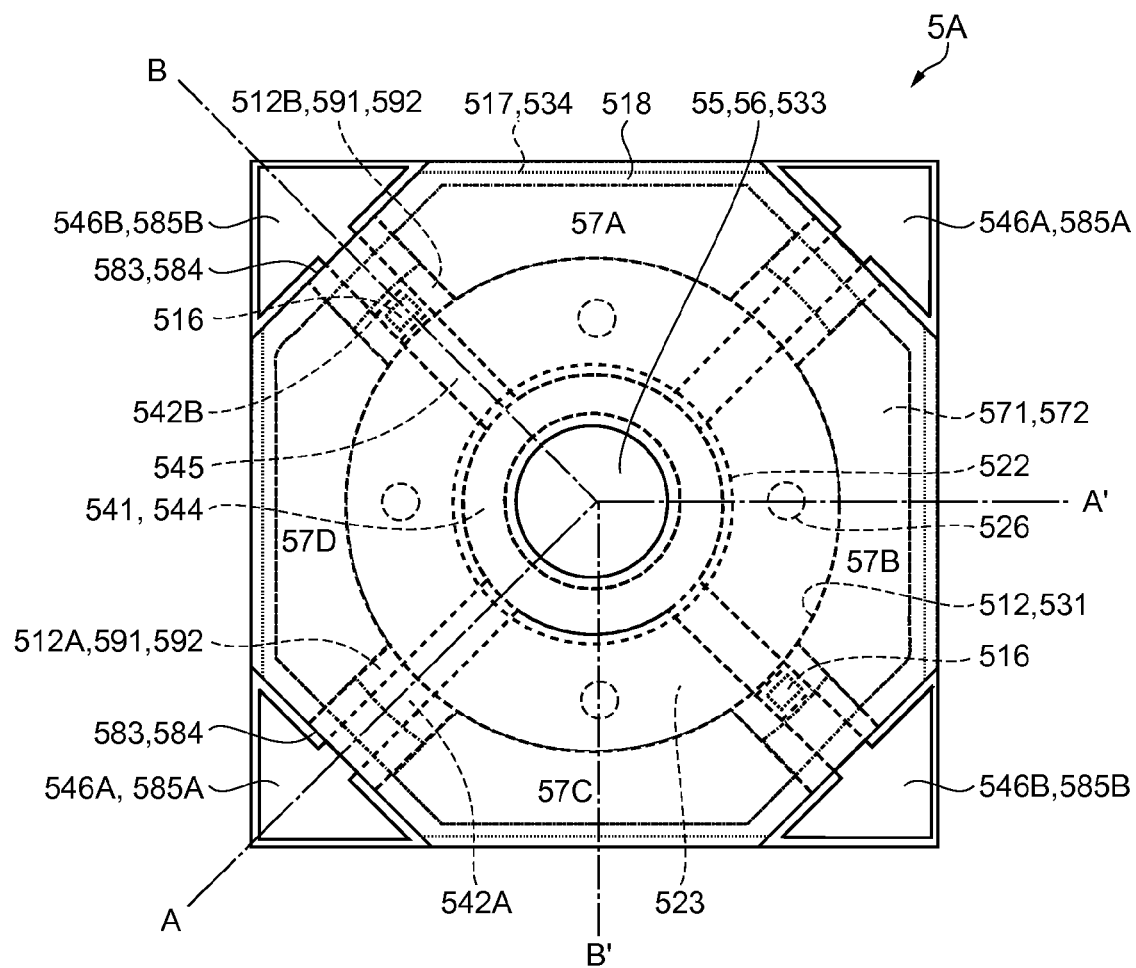
FIG. 9 is a plan view showing a schematic configuration of a variable wavelength interference filter according to a second embodiment of the invention.
Figure 10:
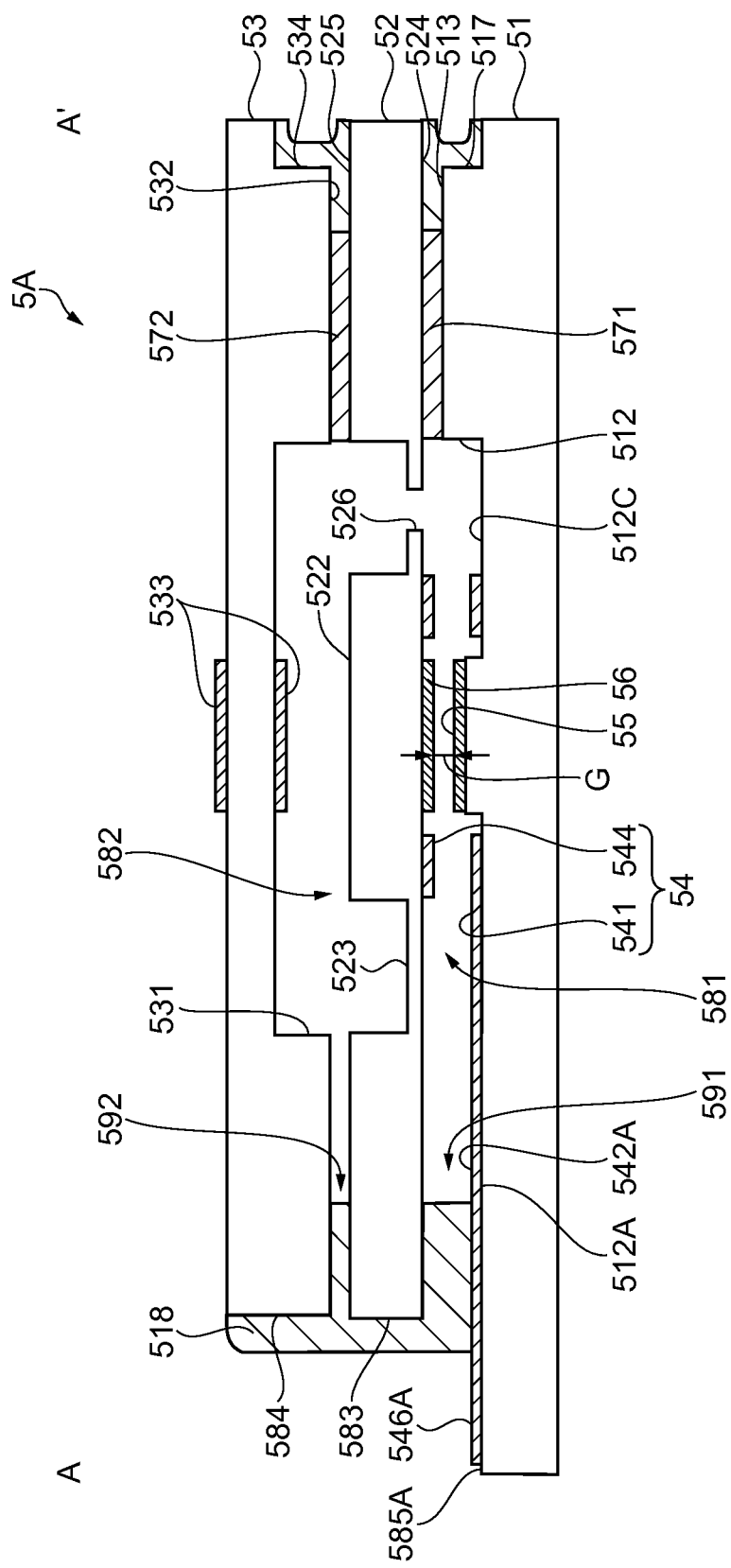
FIG. 10 is a cross-sectional view of the variable wavelength interference filter shown in FIG. 9 along the A-A' line.
Figure 11:
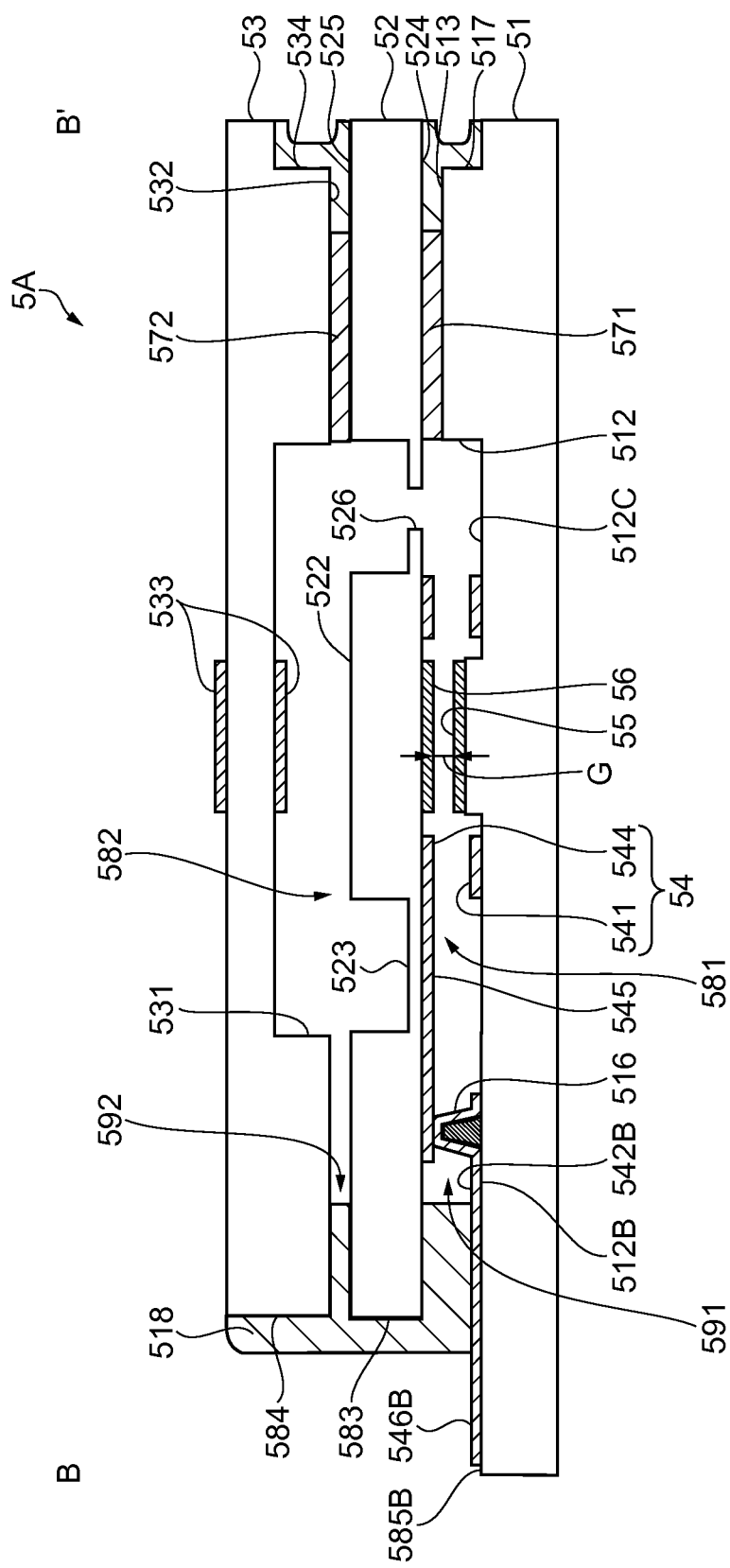
FIG. 11 is a cross-sectional view of the variable wavelength interference filter shown in FIG. 9 along the B-B' line.

FIG. 9 is a plan view showing a schematic configuration of the variable wavelength interference filter according to the second embodiment. FIG. 10 is a cross-sectional view of the variable wavelength interference filter shown in FIG. 9 along the A-A' line. FIG. 11 is a cross-sectional view of the variable wavelength interference filter shown in FIG. 9 along the B-B' line. It should be noted that in explaining the second and later embodiments, the components substantially the same as those of the first embodiment are denoted with the same reference symbols, and the explanation thereof will be omitted or simplified.

The spectroscopic measurement device according to the second embodiment has roughly the same configuration as that of the first embodiment, and is configured including the optical module 10 and the control section 20, and is different from the first embodiment in the configuration of the variable wavelength interference filter 5 provided to the optical module 10.

Specifically, although in the variable wavelength interference filter 5 according to the first embodiment, there is shown the example having the second substrate 52 not provided with a through-hole, in a variable wavelength interference filter 5A according to the second embodiment, a second substrate 52A is provided with through-holes 526.

Figure 12:
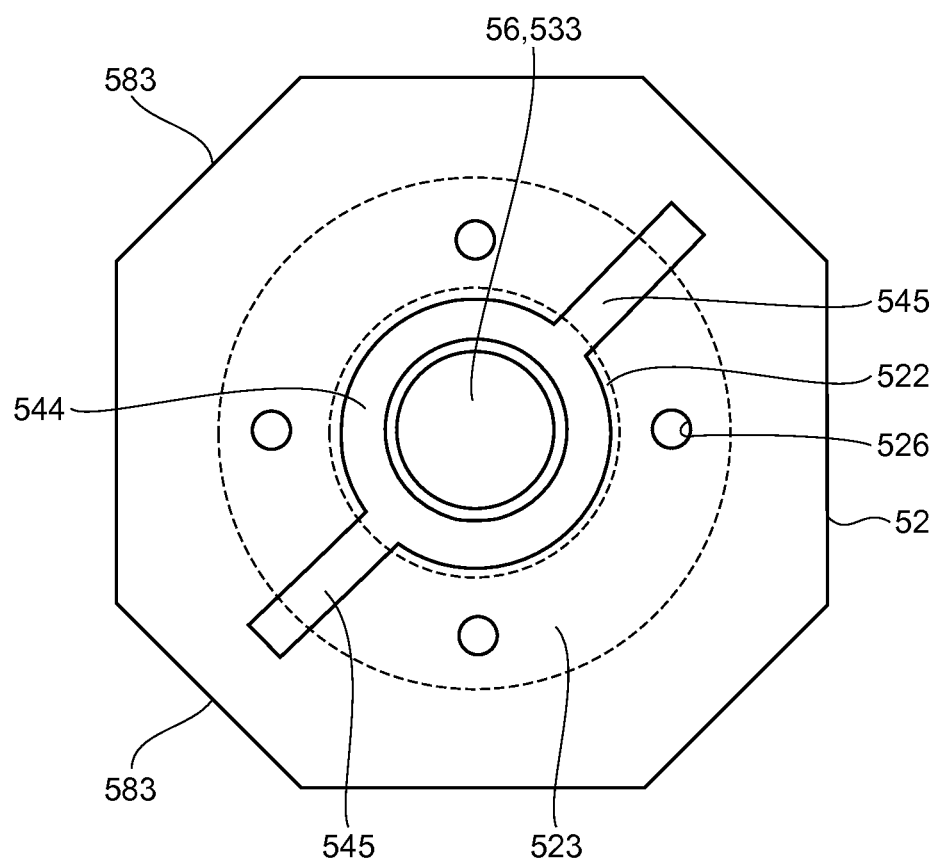
FIG. 12 is a plan view of a second substrate of the second embodiment viewed from the first substrate side.

Specifically, as shown in FIG. 12, in the variable wavelength interference filter 5A according to the second embodiment, the through-holes 526 are formed in the holding section 523 of the second substrate 52A. Through the through-holes 526, the first inner space 581 between the first substrate 51 and the second substrate 52A and the second inner space between the second substrate 52A and the third substrate 53 communicate with each other. The through-holes 526 are each formed by etching, laser processing, or the like.

Such a variable wavelength interference filter 5A can be manufactured by substantially the same manufacturing method as that of the first embodiment. Specifically, the variable wavelength interference filter 5A is formed by bonding the substrates 51, 52A, and 53 to each other, and then airtightly sealing the first and second gaps 591, 592 between the substrates 51, 52A, and 53 with the sealing member 518 while keeping the first inner space 581 between the first substrate 51 and the second substrate 52A of the variable wavelength interference filter 5A and the second inner space 582 between the second substrate 52A and the third substrate 53 in the reduced-pressure state, a dry-air atmosphere, or a nitrogen atmosphere.

Functions and Advantages of Second Embodiment

In the variable wavelength interference filter 5A according to the second embodiment, the following functions and advantages can be obtained.

Specifically, the through-holes 526, through which the first inner space 581 and the second inner space 582 communicate with each other, are provided to the second substrate 52A. Therefore, when performing the sealing while keeping the first inner space 581 and the second inner space 582 in the reduced-pressure state, the dry-air atmosphere, or the nitrogen atmosphere, the pressure in the first inner space 581 and the pressure in the second inner space 582 can be equalized. Therefore, the fluctuation of the movable mirror 56 due to the difference in pressure between the inner spaces can be suppressed to thereby accurately drive the movable mirror 56.

Further, in the optical module 10 and the spectroscopic measurement device 1 each using such a variable wavelength interference filter 5A, since the driving accuracy of the movable mirror 56 of the variable wavelength interference filter 5A can be improved, it is possible to accurately receive the measurement target light and accurately analyze the intensity of each of the color components of the measurement target light.

Other Embodiments

It should be noted that the invention is not limited to the embodiments described above, but includes modifications, improvements, and so on within a range where the advantages of the invention can be achieved.

Although the spectroscopic measurement device 1 is cited in each of the embodiments described above as an example of the electronic apparatus according to the invention, the drive method of the variable wavelength interference filter, the optical module, and the electronic apparatus according to the invention can be applied in a variety of fields besides the above.

For example, the invention can be used as an optical-base system for detecting presence of a specific substance. As such a system, there can be exemplified, for example, an in-car gas leak detector adopting a spectroscopic measurement method using the variable wavelength interference filter according to the invention and detecting a specific gas with high sensitivity, and a gas detection device such as an optoacoustic noble-gas detector for breath-testing.

An example of such a gas detection device will hereinafter be explained with reference to the accompanying drawings.

Figure 13:
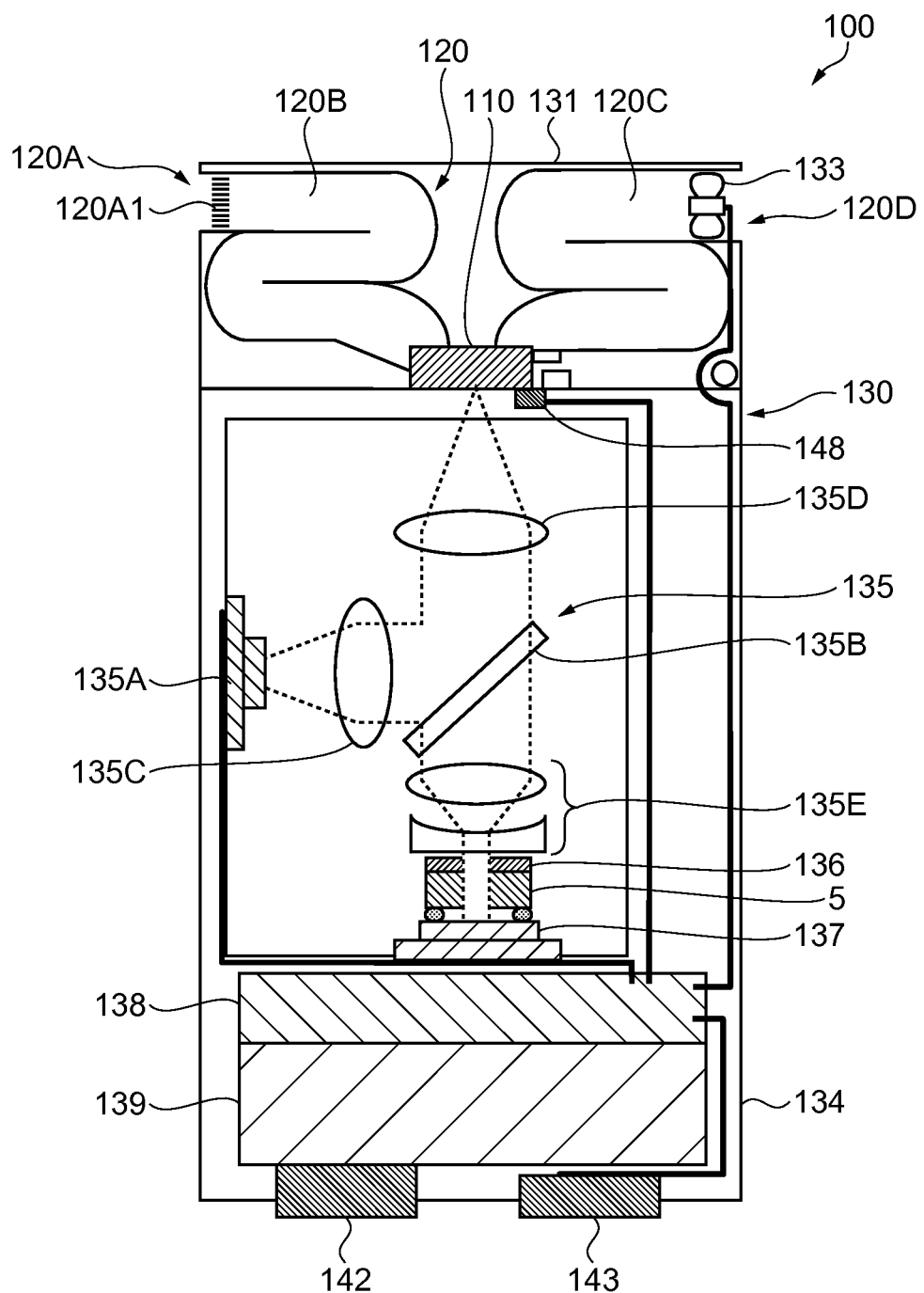
FIG. 13 is a schematic diagram showing a gas detection device (an electronic apparatus) equipped with the variable wavelength interference filter according to the embodiment of the invention.

FIG. 13 is a schematic diagram showing an example of a gas detection device equipped with the variable wavelength interference filter.

Figure 14:
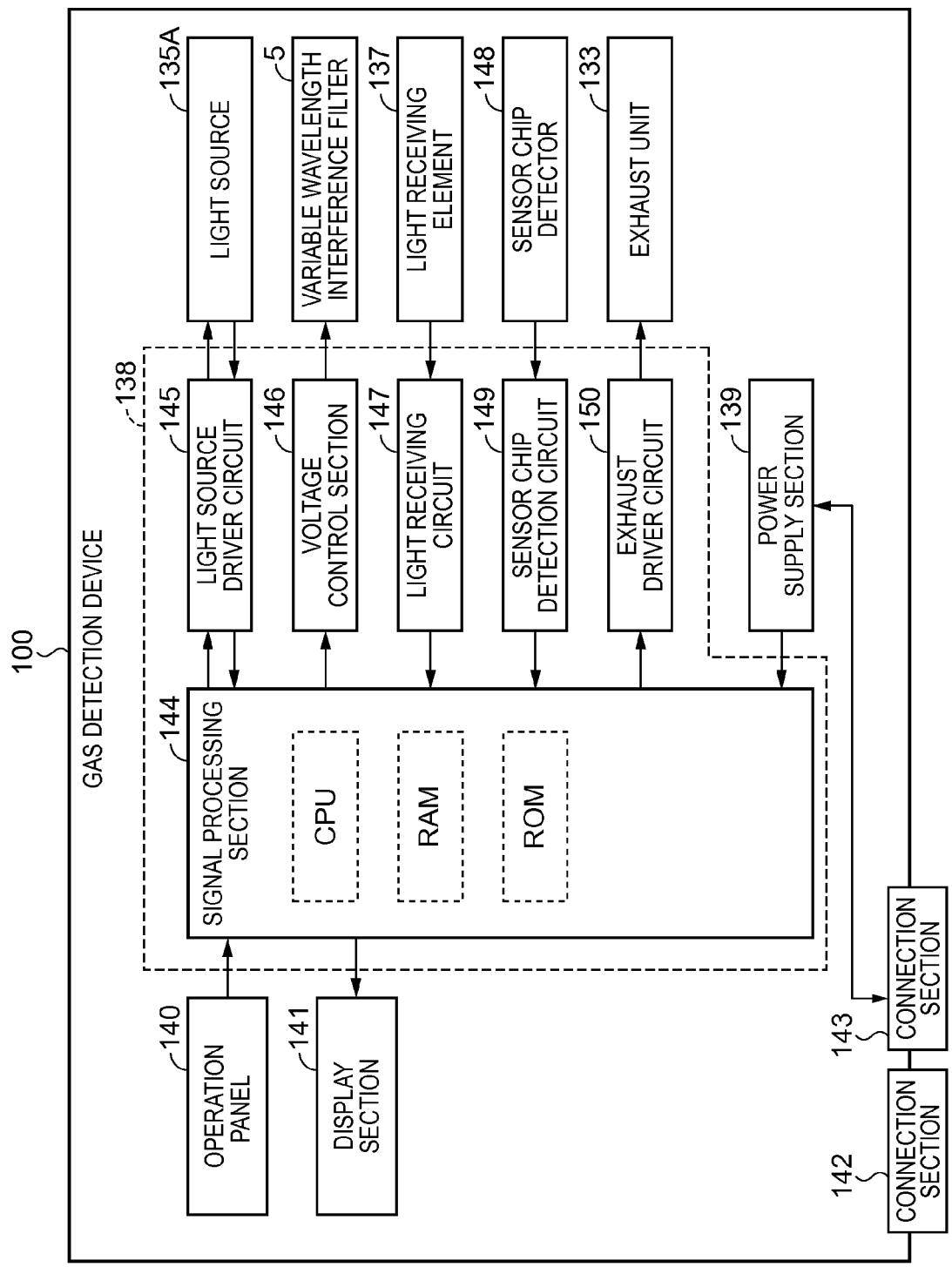
FIG. 14 is a block diagram showing a configuration of a control system of the gas detection device shown in FIG. 13.

FIG. 14 is a block diagram showing a configuration of a control system of the gas detection device shown in FIG. 13.

As shown in FIG. 13, a gas detection device 100 is configured including a sensor chip 110, a channel 120 provided with a suction port 120A, a suction channel 120B, an exhaust channel 120C, and an exhaust port 120D, and a main body section 130.

The main body section 130 is composed of a detection device (an optical module) including a sensor section cover 131 having an opening to which the channel 120 is detachably attached, an exhaust unit 133, a housing 134, an optical section 135, a filter 136, the variable wavelength interference filter 5, a light receiving element 137 (a detection section), and so on, a control section 138 (a processing section) for processing the signal thus detected and controlling the detection section, a power supply section 139 for supplying electrical power, and so on. Further, the optical section 135 includes a light source 135A for emitting light, a beam splitter 135B for reflecting the light, which is input from the light source 135A, toward the sensor chip 110, and transmitting the light, which is input from the sensor chip side, toward the light receiving element 137, and lenses 135C, 135D, and 135E.

Further, as shown in FIG. 14, on the surface of the gas detection device 100, there are disposed an operation panel 140, a display section 141, a connection section 142 for an interface with the outside, and the power supply section 139. In the case in which the power supply section 139 is a secondary cell, a connection section 143 for the battery charge can also be provided.

Further, as shown in FIG. 14, the control section 138 of the gas detection device 100 is provided with a signal processing section 144 composed of a CPU and so on, a light source driver circuit 145 for controlling the light source 135A, a voltage control section 146 for controlling the variable wavelength interference filter 5, a light receiving circuit 147 for receiving the signal from the light receiving element 137, a sensor chip detection circuit 149 for receiving the signal from a sensor chip detector 148 for reading a code of the sensor chip 110 to thereby detect presence or absence of the sensor chip 110, an exhaust driver circuit 150 for controlling the exhaust unit 133, and so on.

Then, an operation of the gas detection device 100 described above will hereinafter be explained.

The sensor chip detector 148 is disposed inside the sensor section cover 131 in the upper part of the main body section 130, and the sensor chip detector 148 detects the presence or absence of the sensor chip 110. When detecting the detection signal from the sensor chip detector 148, the signal processing section 144 determines that it is the condition in which the sensor chip 110 is attached, and outputs a display signal for displaying the fact that the detection operation can be performed to the display section 141.

Then, in the case in which, for example, the user operates the operation panel 140, and the operation panel 140 outputs an instruction signal indicating that the detection process will be started to the signal processing section 144, the signal processing section 144 firstly outputs the signal for operating the light source to the light source driver circuit 145 to thereby operate the light source 135A. When the light source 135A is driven, the light source 135A emits a stable laser beam, which has a single wavelength and is a linearly polarized light. Further, the light source 135A incorporates a temperature sensor and a light intensity sensor, and the information of the sensors is output to the signal processing section 144. Then, in the case in which the signal processing section 144 determines that the light source 135A is operating stably based on the information of the temperature and the light intensity input from the light source 135A, the signal processing section 144 controls the exhaust driver circuit 150 to operate the exhaust unit 133. Thus, the gaseous sample including the target material (the gas molecule) to be detected is guided from the suction port 120A to the suction channel 120B, the inside of the sensor chip 110, the exhaust channel 120C, and the exhaust port 120D. It should be noted that the suction port 120A is provided with a dust filter 120A1, and relatively large dust, some water vapor, and so on are removed.

Further, the sensor chip 110 is a sensor incorporating a plurality of metal nano-structures, and using localized surface plasmon resonance. In such a sensor chip 110, an enhanced electric field is formed between the metal nano-structures due to the laser beam, and when the gas molecules enter the enhanced electric field, the Raman scattered light including the information of the molecular vibration, and the Rayleigh scattered light are generated.

The Rayleigh scattered light and the Raman scattered light pass through the optical section 135 and then enter the filter 136, and the Rayleigh scattered light is separated out by the filter 136, and the Raman scattered light enters the variable wavelength interference filter 5. Then, the signal processing section 144 outputs a control signal to the voltage control section 146. Thus, the voltage control section 146 drives the variable wavelength interference filter 5 using substantially the same drive method as in the first embodiment to thereby make the variable wavelength interference filter 5 disperse the Raman scattered light corresponding to the gas molecules to be the detection target. Subsequently, when the light thus dispersed is received by the light receiving element 137, the light reception signal corresponding to the received light intensity is output to the signal processing section 144 via the light receiving circuit 147. On this occasion, the Raman scattered light to be the target can accurately be taken out from the variable wavelength interference filter 5.

The signal processing section 144 compares the spectrum data of the Raman scattered light corresponding to the gas molecule to be the detection target obtained in such a manner as described above and the data stored in the ROM with each other to thereby determine whether or not the gas molecule is the target one, and thus the substance is identified. Further, the signal processing section 144 makes the display section 141 display the result information, or outputs the result information from the connection section 142 to the outside.

It should be noted that although in FIGS. 13 and 14, there is exemplified the gas detection device 100 for dispersing the Raman scattered light with the variable wavelength interference filter 5, and performing the gas detection based on the Raman scattered light thus dispersed, a gas detection device for identifying the gas type by detecting the absorbance unique to the gas can also be used. In this case, the gas sensor, which makes the gas flow into the sensor, and detects the light absorbed by the gas out of the incident light, is used as the optical module according to the invention. Further, the gas detection device for analyzing and determining the gas flowing into the sensor using such a gas sensor is cited as the electronic apparatus according to the invention. According also to such a configuration, it is possible to detect the component of the gas using the variable wavelength interference filter.

Further, as the system for detecting the presence of the specific substance, besides the gas detection described above, there can be cited a substance component analysis device such as a non-invasive measurement device of a sugar group using near-infrared dispersion, or a non-invasive measurement device of information of food, biological object, or mineral.

Hereinafter, a food analysis device will be explained as an example of the substance component analysis device described above.

Figure 15:
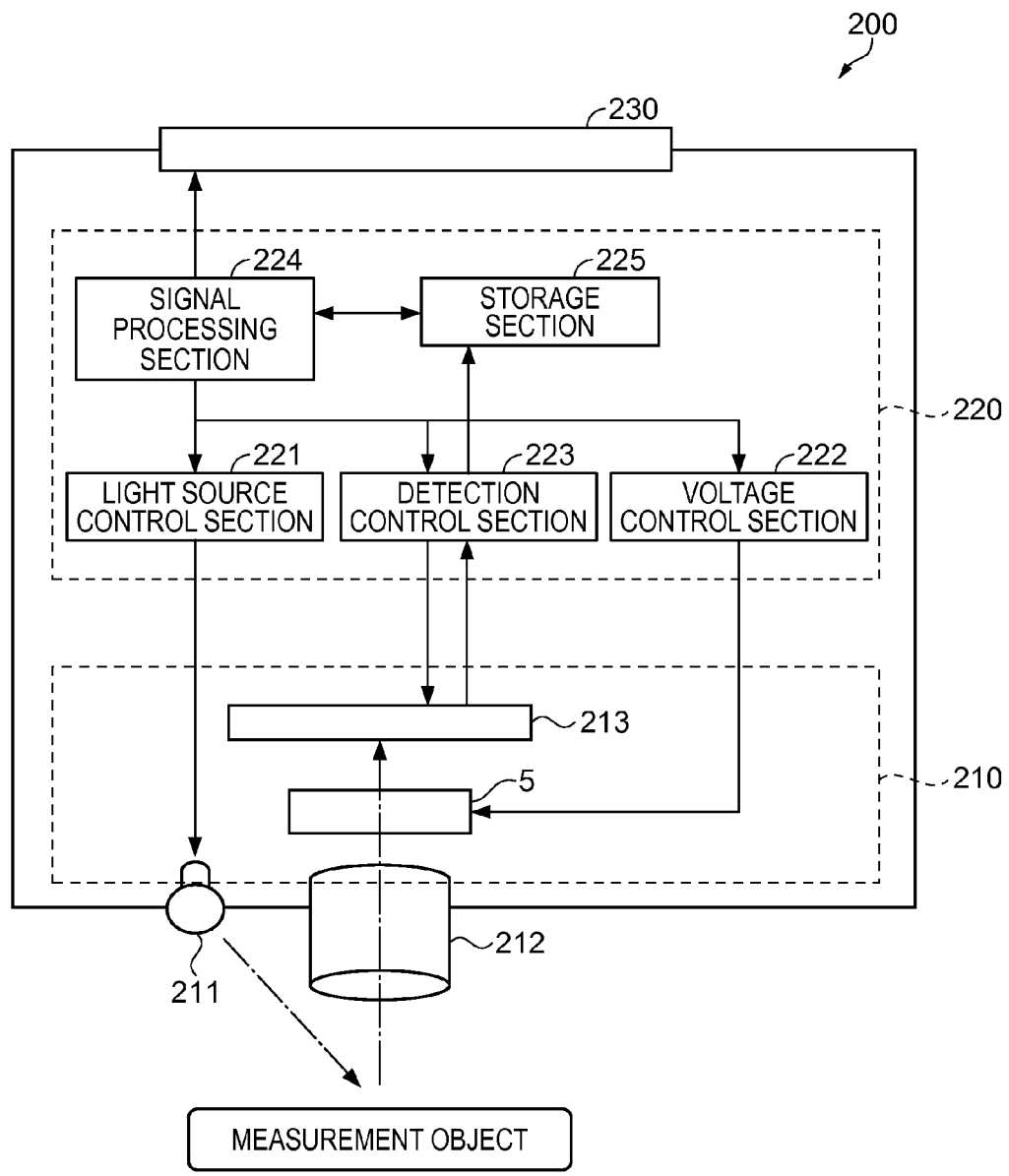
FIG. 15 is a diagram showing a schematic configuration of a food analysis device (the electronic apparatus) equipped with the variable wavelength interference filter according to the embodiment of the invention.

FIG. 15 is a diagram showing a schematic configuration of the food analysis device as an example of the electronic apparatus using the variable wavelength interference filter 5.

As shown in FIG. 15, a food analysis device 200 is provided with a detector 210 (the optical module), a control section 220, and a display section 230. The detector 210 is provided with a light source 211 for emitting light, an image pickup lens 212 to which the light from a measurement object is introduced, the variable wavelength interference filter 5 for dispersing the light thus introduced from the image pickup lens 212, and an image pickup section 213 (a detection section) for detecting the light thus dispersed.

Further, the control section 220 is provided with a light source control section 221 for performing lighting/extinction control of the light source 211 and brightness control in the lighting state, a voltage control section 222 for controlling the variable wavelength interference filter 5, a detection control section 223 for controlling the image pickup section 213 and obtaining a spectral image taken by the image pickup section 213, a signal processing section 224, and a storage section 225.

In the food analysis device 200, when the system is started up, the light source control section 221 controls the light source 211, and the light source 211 irradiates the measurement object with the light. Then, the light reflected by the measurement object passes through the image pickup lens 212 and then enters the variable wavelength interference filter 5. The variable wavelength interference filter 5 is driven with the driving method described in the first embodiment section under the control by the voltage control section 222. Thus, the light with the target wavelength can accurately be taken out from the variable wavelength interference filter 5. Then, the light thus taken out is taken by the image pickup section 213 formed of, for example, a CCD camera. Further, the light thus taken is stored in the storage section 225 as the spectral image. Further, the signal processing section 224 controls the voltage control section 222 to vary the voltage value to be applied to the variable wavelength interference filter 5 to thereby obtain the spectral image corresponding to each wavelength.

Then, the signal processing section 224 performs an arithmetic process on the data of each pixel in each of the images stored in the storage section 225 to thereby obtain the spectrum in each pixel. Further, the storage section 225 stores, for example, information related to a component of food corresponding to the spectrum, and the signal processing section 224 analyzes the data of the spectrum thus obtained based on the information related to the food stored in the storage section 225, and then obtains the food component and the content thereof included in the detection object. Further, the calorie of the food, the freshness thereof, and so on can also be calculated based on the food components and the contents thus obtained. Further, by analyzing the spectral distribution in the image, it is possible to perform extraction of the portion with low freshness in the food as a test object, and further, it is also possible to perform detection of a foreign matter or the like included in the food.

Then, the signal processing section 224 performs a process of making the display section 230 display the information of the components, the contents, the calorie, the freshness, and so on of the food as the test object obtained in such a manner as described above.

Further, although the example of the food analysis device 200 is shown in FIG. 15, it is also possible to use substantially the same configuration as the non-invasive measurement device of other information as described above. For example, it can be used as a biological analysis device for performing analysis of a biological component such as measurement and analysis of a biological fluid such as blood. If a device of detecting ethyl alcohol is provided as a device of measuring the biological fluid component such as blood as an example of such a biological analysis device, the device can be used as a device for detecting the influence of alcohol to the driver to thereby prevent driving under the influence of alcohol. Further, the configuration can also be used as an electronic endoscopic system equipped with such a biological analysis device.

Further, the configuration can also be used as a mineral analysis device for performing component analysis of minerals.

Further, the variable wavelength interference filter, the optical module, and the electronic apparatus according to the invention can be applied to the following devices.

For example, it is also possible to transmit data with the light having each of the wavelengths by temporally varying the intensity of the light having each of the wavelengths, and in this case, it is possible to extract the data transmitted with the light having a specific wavelength by dispersing the light having the specific wavelength using the variable wavelength interference filter provided to the optical module, and then making the light receiving section receive the light. Therefore, by processing the data in the light having each of the wavelengths using the electronic apparatus equipped with such a data extracting optical module, it is also possible to perform optical communication.

Further, the electronic apparatus can be applied to a spectroscopic camera for picking up the spectral image and a spectroscopic analysis device by dispersing the light with the variable wavelength interference filter according to the invention. As an example of such a spectroscopic camera, an infrared camera incorporating the variable wavelength interference filter can be cited.

Figure 16:
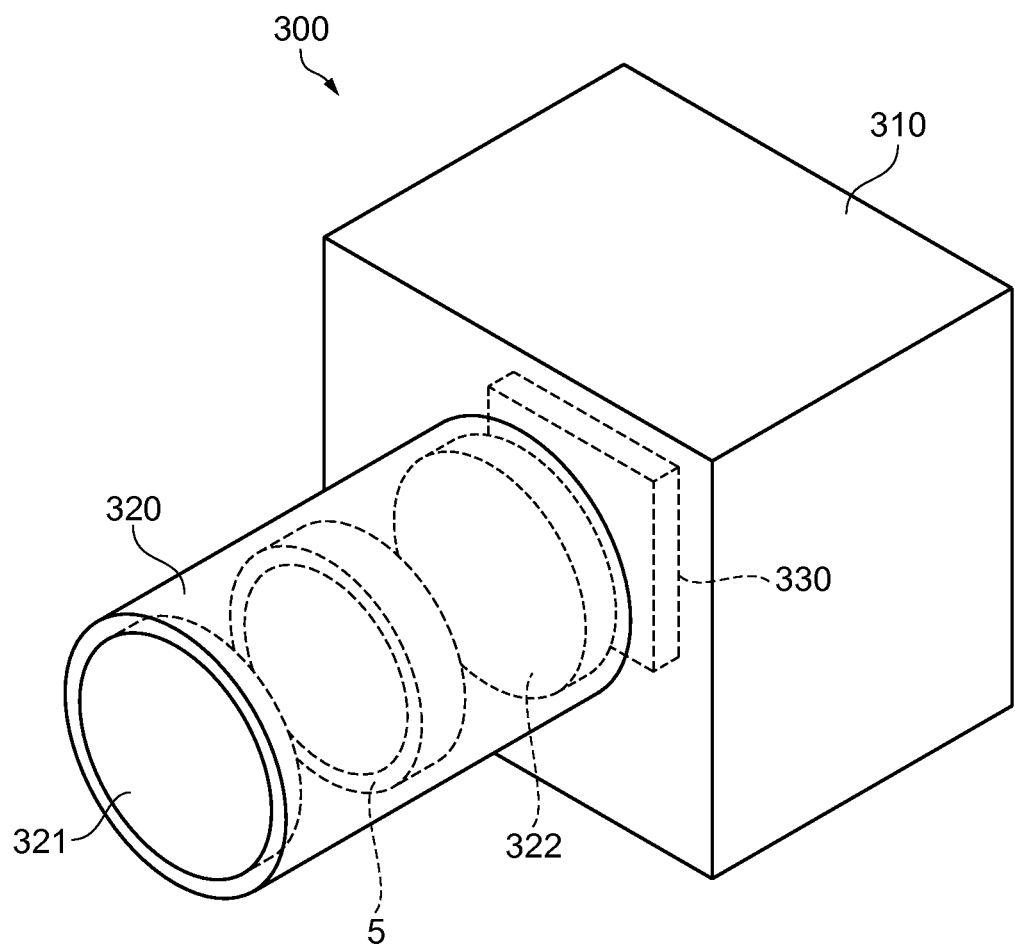
FIG. 16 is a diagram showing a schematic configuration of a spectroscopic camera (the electronic apparatus) equipped with the variable wavelength interference filter according to the embodiment of the invention.

FIG. 16 is a schematic diagram showing a schematic configuration of the spectroscopic camera. As shown in FIG. 13, the spectroscopic camera 300 is provided with a camera main body 310, an image pickup lens unit 320, and an image pickup section 330 (a detection section).

The camera main boy 310 is a part, which is gripped and operated by the user.

The image pickup lens unit 320 is provided to the camera main body 310, and guides the image light input thereto to the image pickup section 330. Further, as shown in FIG. 16, the image pickup lens unit 320 is configured including an objective lens 321, an imaging lens 322, and the variable wavelength interference filter 5 disposed between these lenses.

The image pickup section 330 is formed of a light receiving element, and takes the image of the image light guided by the image pickup lens unit 320.

In such a spectroscopic camera 300, by transmitting the light with the wavelength to be the imaging object using the variable wavelength interference filter 5, the spectral image of the light with a desired wavelength can be taken. On this occasion, since the voltage control section (not shown) drives the variable wavelength interference filter 5 using the drive method according to the invention described in the first embodiment described above with respect to each of the wavelengths, it is possible to accurately take out the image light of the spectral image of the target wavelength.

Further, the variable wavelength interference filter according to the invention can be used as a band-pass filter, and can also be used as, for example, an optical laser device for dispersing and transmitting only the light with a wavelength in a narrow band centered on a predetermined wavelength out of the light in a predetermined wavelength band emitted by the light emitting element using the variable wavelength interference filter.

Further, the variable wavelength interference filter according to the invention can be used as a biometric authentication device, and can be applied to, for example, an authentication device of blood vessels, a fingerprint, a retina, an iris, and so on using the light in a near infrared range or a visible range.

Further, the optical module and the electronic apparatus can be used as a concentration detection device. In this case, the infrared energy (the infrared light) emitted from the substance is dispersed by the variable wavelength interference filter and is then analyzed, and the concentration of the test object in a sample is measured.

As described above, the variable wavelength interference filter, the optical module, and the electronic apparatus according to the invention can be applied to any device for dispersing predetermined light from the incident light. Further, since the variable wavelength interference filter according to the invention can disperse the light into a plurality of wavelength components with a single device as described above, the measurement of the spectrum of a plurality of wavelengths and detection of a plurality of components can be performed with accuracy. Therefore, compared to the related-art device of taking out desired wavelengths with a plurality of devices, miniaturization of the optical module and the electronic apparatus can be promoted, and the optical module and the electronic apparatus can preferably be used as, for example, a portable or an in-car optical device.

Besides the above, specific structures to be adopted when putting the invention into practice can arbitrarily be replaced with other structures and so on within the range in which the advantages of the invention can be achieved.

The entire disclosure of Japanese Patent Application No. 2012-189626 filed on Aug. 30, 2012 is expressly incorporated by reference herein.

What is claimed is:

1. A variable wavelength interference filter comprising:
a first substrate having a first mirror;
a second substrate, which has a movable section provided with a second mirror opposed to the first mirror, and is bonded to the first substrate;
a third substrate, which is opposed to an opposite side of the second substrate to a side provided with the first substrate, and is bonded to the second substrate;
a first inner space disposed between the first substrate and the second substrate;
a second inner space disposed between the second substrate and the third substrate; and
wherein a sealing member adapted to seal the first inner space and the second inner space is disposed between the first substrate and the second substrate, and between the second substrate and the third substrate, the sealing member covering a side surface of the second substrate and a side surface of the third substrate,
a first bonding layer bonds the first substrate and the second substrate,
a second bonding layer bonds the second substrate and the third substrate,
a first portion of the sealing member is disposed outboard from the first bonding layer, and
a second portion of the sealing member is disposed outboard from the second bonding layer.

2. The variable wavelength interference filter according to claim 1, wherein
the first inner space and the second inner space are in a reduced-pressure state with respect to the outside.

3. The variable wavelength interference filter according to claim 1, wherein
the second substrate is provided with a through hole through which the first inner space and the second inner space communicate with each other.

4. The variable wavelength interference filter according to claim 1, further comprising:

a pair of displacing electrodes opposed to each other provided respectively to the first substrate and the second substrate;
a plurality of extraction electrodes provided respectively to the first substrate and the second substrate, and electrically connected to the displacing electrodes;
a first penetration section formed by removing a part of the second substrate in an area of the second substrate overlapping at least one of the extraction electrodes in a plan view viewed from a thickness direction of the second substrate;
a second penetration section formed by removing a part of the third substrate in an area of the third substrate overlapping at least one of the extraction electrodes in the plan view;
a first sealing groove disposed along an outer circumferential portion of a first gap and communicating with the first penetration section and the second penetration section; and
a second sealing groove disposed along an outer circumferential portion of a second gap and communicating with the first penetration section and the second penetration section,
wherein the first sealing groove is sealed with the sealing member, and the second sealing groove is sealed with the sealing member.

5. The variable wavelength interference filter according to claim 1, wherein
the sealing member is made of synthetic resin.

6. The variable wavelength interference filter according to claim 5, wherein
the synthetic resin is a para-xylylene polymer.

7. The variable wavelength interference filter according to claim 1, wherein
the sealing member is formed of an inorganic thin film.

8. An optical module comprising:
the variable wavelength interference filter according to claim 1; and
a detection section adapted to detect light,
wherein the first mirror and the second mirror constitute an optical interference region, and
the detection section detects the light taken out by the optical interference region.

9. An optical module comprising:
the variable wavelength interference filter according to claim 2; and
a detection section adapted to detect light,
wherein the first mirror and the second mirror constitute an optical interference region, and
the detection section detects the light taken out by the optical interference region.

10. An optical module comprising:
the variable wavelength interference filter according to claim 3; and
a detection section adapted to detect light,
wherein the first mirror and the second mirror constitute an optical interference region, and
the detection section detects the light taken out by the optical interference region.

11. An optical module comprising:
the variable wavelength interference filter according to claim 4; and
a detection section adapted to detect light,
wherein the first mirror and the second mirror constitute an optical interference region, and
the detection section detects the light taken out by the optical interference region.

12. An electronic apparatus comprising:
a control section; and
the optical module according to claim 8.

13. An electronic apparatus comprising:
a control section; and
the optical module according to claim 9.

14. An electronic apparatus comprising:
a control section; and
the optical module according to claim 10.

15. An electronic apparatus comprising:
a control section: and the optical module according to claim 11.

16. A variable wavelength interference filter comprising:
a first substrate;
a second substrate, which is disposed so as to be opposed to the first substrate, and has a movable section and a holding section adapted to hold the movable section so as to be able to be displaced in a thickness direction of the first substrate;
a third substrate disposed on an opposite surface of the second substrate to a surface, on which the first substrate is disposed, so as to be opposed to the second substrate;
a first mirror disposed on a surface of the movable section opposed to the first substrate;
a second mirror provided to the first substrate, and disposed so as to be opposed to the first mirror via a gap; and
an actuator adapted to vary the gap,
wherein the first substrate and the second substrate are bonded to each other with a first bonding layer, and the second substrate and the third substrate are bonded to each other with a second bonding layer,
a first recessed section is formed between the first substrate and the second substrate,
a second recessed section is formed between the second substrate and the third substrate,
a sealing member including a first portion and a second portion is disposed between the first substrate and the second substrate, and between the second substrate and the third substrate, the sealing member covering a side surface of the second substrate and a side surface of the third substrate,
the first portion of the sealing member is disposed between the first substrate and the second substrate at a position outboard from the first bonding layer,
the second portion of the sealing member is disposed between the second substrate and the third substrate at a position outboard from the second bonding layer.

17. A method of manufacturing a variable wavelength interference filter comprising:
disposing a second substrate so as to be opposed to a first substrate having a first recessed section to form a first inner space formed of the first recessed section;
disposing a third substrate, which has a second recessed section, on an opposite surface of the second substrate to a surface, on which the first substrate is disposed, so as to be opposed to the second substrate to form a second inner space formed of the second recessed section;
obtaining a bonded body by bonding the first substrate and the second substrate to each other via a first bonding layer and bonding the second substrate and the third substrate to each other via a second bonding layer; and
sealing the first recessed section and a second recessed section with a sealing member, the sealing member including a first portion disposed between the first substrate and the second substrate at a position located outboard from the first bonding layer, and including a second portion disposed between the second substrate and the third substrate at a position located outboard from the second bonding layer, and the sealing member covering a side surface of the second substrate and a side surface of the third substrate.

18. The method of manufacturing a variable wavelength interference filter according to claim 17, further comprising:
   setting the first inner space and the second inner space to a reduced-pressure state.

19. The method of manufacturing a variable wavelength interference filter according to claim 17, wherein
   the bonded body having a plurality of variable wavelength interference filters arranged in an array,
   the method further comprising:
      providing a first penetration section to the second substrate;
      providing a second penetration section to the third substrate;
      providing a first sealing groove, which communicates with the first penetration section, to the first substrate;
      providing a second sealing groove, which communicates with the second penetration section, to the third substrate; and
      cutting the bonded body into segments corresponding respectively to the variable wavelength interference filters.

* * * * *